US012702222B1

(12) United States Patent
Li

(10) Patent No.: US 12,702,222 B1
(45) Date of Patent: Aug. 11, 2026

(54) ELECTRIC STEAM CLEANER

(71) Applicant: Shenzhen Sulang Technology Co., Ltd, Shenzhen City (CN)

(72) Inventor: WenMing Li, Shenzhen City (CN)

(73) Assignee: Shenzhen Sulang Technology Co., Ltd, Shenzhen City (CN)

( * ) Notice: Subject to any disclaimer, the term of this patent is extended or adjusted under 35 U.S.C. 154(b) by 0 days.

(21) Appl. No.: 19/425,913

(22) Filed: Dec. 18, 2025

(30) Foreign Application Priority Data

Oct. 23, 2025 (CN) ......................... 202511526154.9

(51) Int. Cl.

| | |
|---|---|
| ***A46B 13/04*** | (2006.01) |
| ***A46B 13/00*** | (2006.01) |
| ***A47L 11/40*** | (2006.01) |
| ***B08B 1/40*** | (2024.01) |

(52) U.S. Cl.
CPC ............ *A46B 13/04* (2013.01); *A46B 13/008* (2013.01); *A47L 11/4069* (2013.01); *B08B 1/40* (2024.01); *B08B 2230/01* (2013.01)

(58) Field of Classification Search
CPC .. A47L 11/4086; A47L 11/34; A47L 11/4088; A47L 11/4069; A47L 7/0009; B08B 2230/01; B08B 3/00; B08B 1/40; A46B 13/04; A46B 13/008; A46B 13/02; A46B 13/001
See application file for complete search history.

(56) References Cited

U.S. PATENT DOCUMENTS 12,349,783 B1 * 7/2025 He ....................... A46B 15/003

FOREIGN PATENT DOCUMENTS

| | | | | |
|---|---|---|---|---|
| CN | 201657961 U | * | 12/2010 | ............. A46B 13/02 |
| CN | 102657502 A | * | 9/2012 | .............. A47L 11/34 |
| CN | 120021906 A | * | 5/2025 | ......... A46B 15/0002 |

* cited by examiner

*Primary Examiner* — Laura C Guidotti
(74) *Attorney, Agent, or Firm* — Ying-Ting Chen

(57) ABSTRACT

An electric cleaner includes a steam delivery system, a cleaning head and a drive assembly. The steam delivery system directs high-temperature steam to the cleaning head, so as to form a high-temperature steam environment. The drive assembly electrically drives the cleaning head to move within the high-temperature steam environment.

14 Claims, 20 Drawing Sheets

ELECTRIC STEAM CLEANER

CROSS REFERENCE OF RELATED APPLICATION

This application is anon-provisional application that claims priority under 35 U.S.C. § 119 to China application number CN202511526154.9, filing date Oct. 23, 2025, wherein the entire content of which is expressly incorporated herein by reference.

BACKGROUND OF THE PRESENT INVENTION

Field of Invention

The present invention relates to steam cleaning, and more particularly to an electric steam cleaner.

Description of Related Arts

Steam cleaning is an environmentally friendly cleaning method, through high temperature steam to dissolve stains, thorough sterilization and disinfection.

However, current steam cleaners still fall short of meeting consumers' daily cleaning needs. A widely adopted model delivers steam directly to the cleaning nozzle. Users hold a handheld steam generator and move it along with the nozzle to clean surfaces. This method requires users to carry a heavy device while moving the nozzle, which can lead to hand fatigue during prolonged use and reduce cleaning efficiency.

In addition, the user needs to further control the movement of the cleaning head by moving the steam cleaner. It is difficult to control the direction and force of the cleaning head, and it is difficult to operate accurately, resulting in poor cleaning effect.

In short, the existing steam cleaners have obvious shortcomings in operation convenience and cleaning effect, especially when dealing with large areas or serious stains, it is difficult to achieve ideal results.

SUMMARY OF THE PRESENT INVENTION

The present invention is advantageous in that it provides an electric steam cleaner, in which the electric steam cleaner cleans articles by means of high temperature steam and automatic rotation of a cleaning head, so as to improve the cleaning efficiency.

Another advantage of the present invention is to provide an electric steam cleaner, wherein the electric steam cleaner cleans articles by combining high temperature steam with automatic rotation of a cleaning head, wherein steam is emitted from the position of a rotating shaft of the cleaning head, so as to ensure uniform distribution of steam in the cleaning process and improve cleaning efficiency.

Another advantage of the present invention is to provide an electric steam cleaner that cleans objects through high-temperature steam combined with an automatically rotating cleaning head. The cleaning head defines a central through hole for a steam injection assembly, ensuring the steam injection assembly remains stationary during rotation, so as to maintain structural stability of the steam injection assembly and reduces leakage risks while maintaining operational efficiency.

Another advantage of the present invention is to provide an electric steam cleaner that utilizes high-temperature steam in conjunction with a rotating cleaning head for automatic cleaning, wherein the cleaning head defines a central through hole for a steam injection assembly, wherein the center of the steam injection assembly aligns with the a rotating axis of the cleaning head, whereby minimizing the clearance space dimensions while ensuring optimal cleaning area coverage and operational efficiency.

Another advantage of the present invention is to provide an electric steam cleaner, wherein the electric steam cleaner cleans articles by combining high temperature steam with automatic rotation of a cleaning head, wherein the cleaning head rotates automatically by electric drive, which reduces the operation burden of the user and improves the cleaning efficiency.

Another advantage of the present invention is to provide an electric steam cleaner, wherein the electric steam cleaner cleans articles by means of high temperature steam and automatic rotation of the cleaning head, in which the cleaning head is automatically rotated by a rotating motor, wherein the rotating motor driving the cleaning head is eccentrically arranged to avoid interference with the a steam injection assembly 213.

Another advantage of the present invention is to provide an electric steam cleaner that cleans objects through high-temperature steam combined with an automatically rotating cleaning head, wherein the cleaning head is driven to rotate by a rotating motor, wherein a torque-enhancing assembly is installed between the rotating motor and the cleaning head, so as to ensure smooth and powerful rotation of the cleaning head, thereby further enhancing cleaning effectiveness.

Another advantage of the present invention is to provide an electric steam cleaner that cleans objects through high-temperature steam combined with an automatically rotating cleaning head, wherein the cleaning head is driven to rotate by a rotating motor, wherein a torque-enhancing gear assembly is installed between the rotating motor and the cleaning head, so as to ensure smooth and powerful rotation of the cleaning head, thereby further enhancing cleaning effectiveness.

Another advantage of the present invention is to provide an electric steam cleaner that cleans objects through high-temperature steam combined with an automatically rotating cleaning head, wherein the cleaning head rotates via electric drive, and a drive assembly driving the cleaning head are separated from a steam delivery system, so as to prevent adverse effects on the performance of the drive assembly caused by high-temperature steam exposure.

Another advantage of the present invention is to provide an electric steam cleaner that cleans objects through high-temperature steam combined with an automatically rotating cleaning head, wherein the cleaning head rotates via electric drive, and a drive assembly driving the cleaning head are separated from a steam delivery system, wherein a housing designed to secure the drive assembly features a handle section, which not only prevents direct contact between the operator and high-temperature steam zones but also positions the user's hand closer to the cleaning head, facilitating precise control of its movement.

Another advantage of the present invention is to provide an electric steam cleaner that cleans objects through high-temperature steam combined with an automatically rotating cleaning head, wherein the cleaning head rotates via electric drive, and a drive assembly driving the cleaning head are separated from a steam delivery system, wherein a housing designed to secure the drive assembly features a handle section, so as to help the user to handle the electric steam cleaner more steadily.

Another advantage of the present invention is to provide an electric steam cleaner that cleans objects through high-temperature steam combined with an automatically rotating cleaning head, wherein the cleaning head rotates via electric drive, and a drive assembly driving the cleaning head are separated from a steam delivery system, wherein a housing designed to secure the drive assembly features a handle section, wherein an extension tube is used to communicate a steam generator and an electric cleaner, so that operators can move freely without holding the steam generator, significantly reducing manual strain.

Another advantage of the present invention is to provide an electric steam cleaner that cleans objects through high-temperature steam combined with an automatically rotating cleaning head, wherein an electric cleaner is detachably connected to a steam generator, allowing easy replacement of different cleaning heads to accommodate various cleaning requirements.

Another advantage of the present invention is to provide an electric steam cleaner that cleans objects through high-temperature steam combined with an automatically rotating cleaning head, wherein an electric cleaner is detachably connected to a steam generator, allowing direct compatibility with existing steam systems, so as to facilitate easier and more eco-friendly upgrades for modern household cleaning solutions.

Another advantage of the present invention is to provide an electric steam cleaner that cleans objects through high-temperature steam combined with an automatically rotating cleaning head, wherein the cleaning head of the electric cleaner adopts a detachable structure such as a snap-fit design, enabling quick disassembly and replacement to enhance operational efficiency.

According to one aspect of the present invention, an electric cleaner is provided. The electric cleaner comprises a steam delivery system, a cleaning head, and a drive assembly. The steam delivery system directs high-temperature steam to the cleaning head, so as to form a high-temperature steam environment, wherein the drive assembly electrically drives the cleaning head to move within the high-temperature steam environment.

According to one embodiment of the present invention, the drive assembly comprises a rotating motor and an eccentric transmission assembly. The rotating motor is powered by electrical energy to generate rotational force around a first axis. The eccentric transmission assembly is driven by the rotational force from the rotating motor, thereby rotating the cleaning head around a second axis. The first axis and the second axis maintain a predetermined distance while remaining parallel to each other.

According to one embodiment of the present invention, the steam delivery system guides the steam to a central axial position of the cleaning head.

According to one embodiment of the present invention, the eccentric transmission assembly comprises a torque-enhancing assembly and a passive rotary body. The torque-enhancing assembly is driven by the rotating motor to rotate around the first axis. The passive rotary body engages with the torque-enhancing assembly and rotates around the second axis under the drive of the torque-enhancing assembly, thereby driving the cleaning head to rotate around the second axis.

According to one embodiment of the present invention, the torque-enhancing assembly adopts a gear transmission structure.

According to one embodiment of the present invention, the torque-enhancing assembly is a tower gear structure.

According to one embodiment of the present invention, the torque-enhancing assembly is a planetary gear structure.

According to one embodiment of the present invention, the torque-enhancing assembly comprises a first sun gear, a first planetary gear set, an internal gear ring, a first turntable, a second sun gear, a second planetary gear set, and a second turntable. The rotating motor comprises a motor body and a motor output shaft extending from the motor body, wherein the defining the first axis. The motor output shaft is driven to rotate around the first axis. The first sun gear is fixedly connected to the motor output shaft, rotating with the motor output shaft to drive the first planetary gear set to rotate around the first sun gear. The internal ring gear engages with the first planetary gear set to guide the rotation of the first planetary gear set. Movement of the first planetary gear set drives the first turntable to rotate around the first shaft. Rotation of the first turntable synchronously drives the second sun gear to rotate, and further drives the second planetary gear set to rotate around the second sun gear. The internal ring gear engages with the second planetary gear set to limit the rotation of the second planetary gear set. Movement of the second planetary gear set drives the second turntable to rotate around the first shaft. The second turntable engages with a passive rotary body, so as to drive the passive rotary body to rotate around the second axis and further drive the cleaning head to rotate around the second axis.

According to one embodiment of the present invention, the steam delivery system comprises a connector, a conduit and a steam injection assembly, wherein high temperature steam is introduced from the connector, enters the conduit and is ejected through the steam injection assembly.

According to one embodiment of the present invention, an extension direction of the steam injection assembly is perpendicular to the rotation direction of the cleaning head, so as to ensure that the steam injection direction intersects with the rotation direction of the cleaning head.

According to one embodiment of the present invention, the steam injection assembly comprises an adapter and a nozzle, wherein the adapter is connected between the nozzle and the conduit, and wherein the nozzle is made of metal.

According to one embodiment of the present invention, the cleaning head comprises a brush body and a fixation body, wherein the brush body is fixedly connected to the fixation body, and the fixation body has a through hole for the steam injection assembly to pass through.

According to one embodiment of the present invention, the through hole is arranged at an axial position of the fixation body, wherein the fixation body further has a steam guide channel communicating with the through hole.

According to one embodiment of the present invention, the passive rotary body comprises an eccentric gear and an extension body, wherein the extension body extends from the eccentric gear, and the passive rotary body further has a rotor channel for passing through the steam delivery system.

According to one embodiment of the present invention, the electric cleaner further comprises a shell. The shell comprises a steam passage section and a handle section, wherein the steam passage section is spaced apart from the handle section. The steam passage section defines a steam delivery system channel through which the steam delivery system passes.

According to one embodiment of the present invention, the steam delivery system further comprises an insulating material, wherein the insulating material is arranged to outer periphery of the conduit and is fixed in the steam delivery system channel.

According to one embodiment of the present invention, the eccentric transmission assembly further comprises a gear housing for accommodating and fixing the torque-enhancing assembly and the passive rotary body.

According to one embodiment of the present invention, the electric cleaner further comprises a control system and a power supply unit. The power supply unit powers both the control system and the rotating motor. The control system comprises a current detection module and a control module. The current detection module monitors current flowing through the rotating motor. When the detected current exceeds a predetermined threshold, the control module activates to stop the operation of the rotating motor.

According to one embodiment of the present invention, the connector has a detachable connection structure, so as to be detachably connected to a steam generator.

According to one embodiment of the present invention, the detachable connection structure is selected from threads, grooves, bumps and key card slots.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
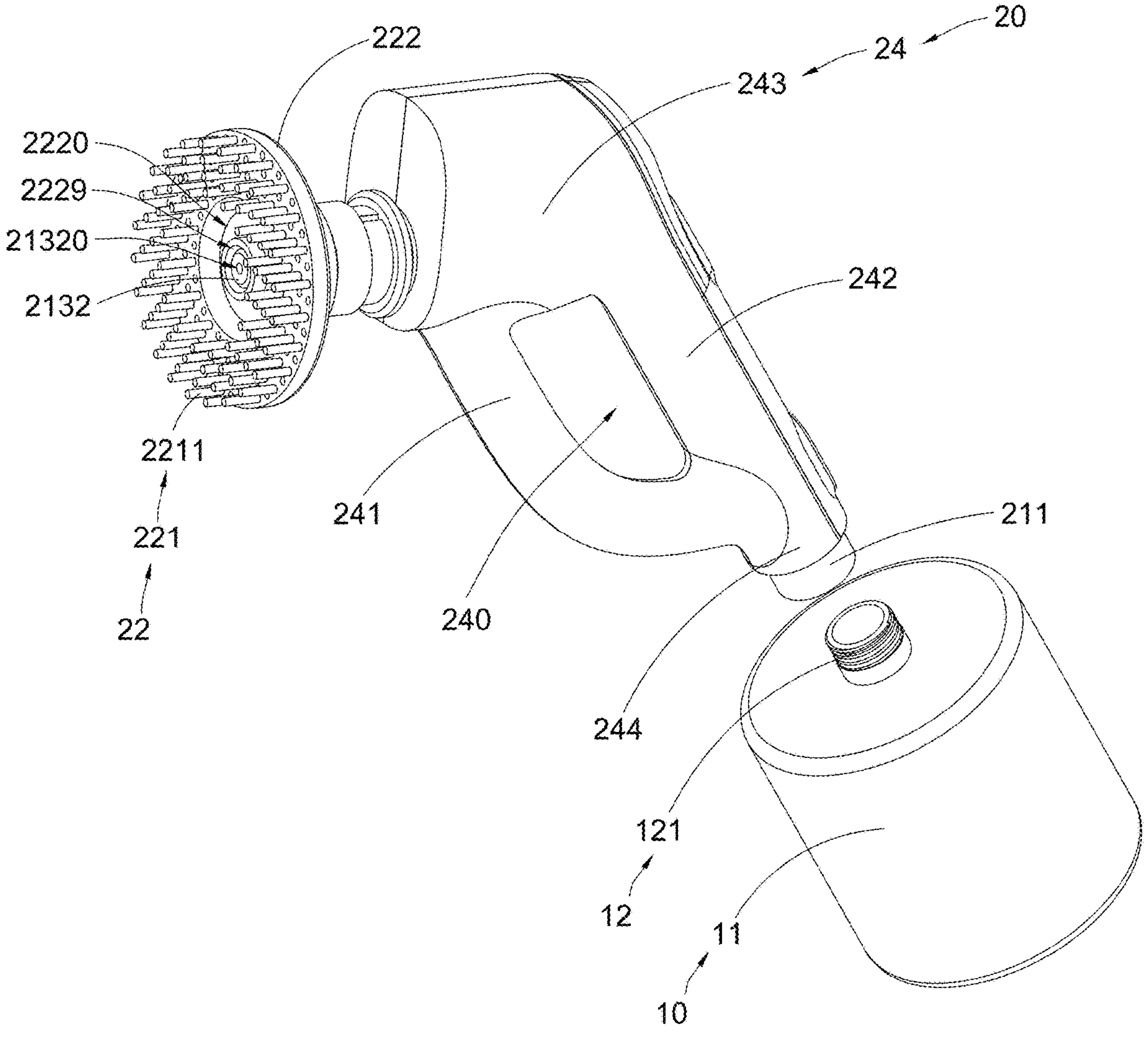
FIG. 1 is a perspective view of an electric steam cleaner according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

FIGS. 1 to 8 of the drawings illustrate an electric steam cleaner according to a first preferred embodiment of the present invention. The electric steam cleaner comprises a steam generator 10 and an electric cleaner 20, where steam generated by the steam generator 10 is delivered to the electric cleaner 20 to work for cleaning purposes.

The steam generator 10 comprises a steam generation body 11 and an exhaust connector 12 communicating with the steam generation body 11, wherein the electric cleaner 20 is detachably installed to the exhaust connector 12 of the steam generator 10. The exhaust connector 12 has a connecting structure 121 detachably connected with the electric cleaner 20.

The electric cleaner 20 comprises a steam delivery system 21 and a cleaning head 22. The steam delivery system 21 delivers steam generated by the steam generator 10 to the vicinity of the cleaning head 22. When the cleaning head 22 is placed on a surface requiring cleaning, the delivered steam simultaneously acts on the surface to soften stains. Combined with the cleaning action of the cleaning head 22, this dual mechanism effectively removes stains from a surface of an object.

According to the above first preferred embodiment of the present invention, the cleaning head 22 is electrically driven to rotate, thereby enhancing cleaning efficiency and reducing user burden. The steam delivery system 21 supplies steam to a central axis position of the cleaning head 22 to ensure uniform distribution. The electric cleaner 20 further comprises a drive assembly 23 for rotating the cleaning head 22. This drive assembly 23 comprises a rotating motor 231 and an eccentric transmission assembly 232. Driven by the rotating motor 231, the eccentric transmission assembly 232 drives the cleaning head 22 to rotate. In detail, the rotating shaft of the rotating motor 231 is parallel to and maintains a first predetermined distance from the rotating shaft of the cleaning head 22. In detail, the rotating motor 231 is offset from the cleaning head 22 to provide clearance space for the steam delivery system 21 to supply steam to the central axis position of the cleaning head 22, thereby preventing interference.

The eccentric transmission assembly 232 comprises a torque-enhancing assembly 2321 and a passive rotary body 2322. The torque-enhancing assembly 2321 is driven by the rotating motor 231 to rotate around a first axis L1, which subsequently drives the passive rotary body 2322 to rotate around a second axis L2. The first axis L1 and the second axis L2 are parallel with each other and maintain the first predetermined distance between them. The first axis L1 passes through a rotation axis of the rotating motor 231, while the second axis L2 passes through a rotation shaft of the cleaning head 22.

The torque-enhancing assembly 2321 is designed to reduce rotational speed while enhancing torque output. The high-speed rotation from the rotating motor 231 is transmitted to the torque-enhancing assembly 2321, enabling it to deliver high-torque operation at lower speeds, which drives the passive rotary body 2322 to rotate smoothly, and further drives the cleaning head 22 mounted on the passive rotary body 2322 to rotate, so as to provide a stable, silent, and efficient cleaning process through continuous rotation of the cleaning head 22.

The torque-enhancing assembly 2321 is connected to both the rotating motor 231 and the passive rotary body 2322 via a gear drive mechanism. The eccentric transmission assembly 232 further comprises a gear housing 2323, wherein the gear housing has a gear chamber 23230 housing the torque-enhancing assembly 2321. This gear housing 2323 provides positioning and protection for the torque-enhancing assembly 2321.

The passive rotary body 2322 comprises an eccentric gear 23221 and an extension body 23222. The eccentric gear 23221 engages with the torque-enhancing assembly 2321, thereby being driven to rotate by the torque-enhancing assembly 2321. The extension body 23222 extends from the eccentric gear 23221 along the second axis L2, forming a structure designed for mounting the cleaning head 22. When the eccentric gear 23221 is driven by the torque-enhancing assembly 2321 to rotate, the extension body 23222 rotates synchronously with the eccentric gear 23221, driving the cleaning head 22 to rotate accordingly. According to the above first preferred embodiment of the present invention, the extension body 23222 and the eccentric gear 23221 are integrally formed.

The torque-enhancing assembly 2321 can be specifically implemented as a gear structure, a worm gear and worm drive structure, a specifically implemented as a gear structure, a worm gear and worm drive structure, a belt drive plus reduction gear structure, or other structures. According to the above first preferred embodiment of the present invention, the torque-enhancing assembly 2321 is configured as a planetary gear mechanism. The torque-enhancing assembly 2321 achieves high-efficiency power transmission through the precision meshing of an internal gear ring, planetary gears, and a sun gear, ensuring stable operation of the cleaning head 22 at lower speeds with high torque output while improving cleaning performance. In detail, the torque-enhancing assembly 2321 comprises a first sun gear 23211, a first planetary gear set 23212, and an internal gear ring 23213. The first sun gear 23211 is connected to the rotating motor 231 and rotates synchronously with the rotating motor 231. The first planetary gear set 23212 rotates around the first sun gear 23211 while meshing with the internal gear ring 23213, thereby transmitting power and reducing speed while increasing torque. The rotating motor 231 comprises a motor body 2311 and a motor output shaft 2312 extending from the motor body 2311, wherein the motor output shaft 2312 rotates along with the operation of the motor body 2311. The motor output shaft 2312 extends in the direction of the first axis L1 and is rigidly engaged with the first sun gear 23211, transmitting the power of the rotating motor 231 to the torque-enhancing assembly 2321. Through the rotation of the first sun gear 23211, the first planetary gear set 23212 is driven to orbit around the first sun gear 23211 and engage with the internal gear ring 23213 at the same time, so as to realize the efficient transmission of power and the reduction of speed, and increase the output torque.

Figure 7:
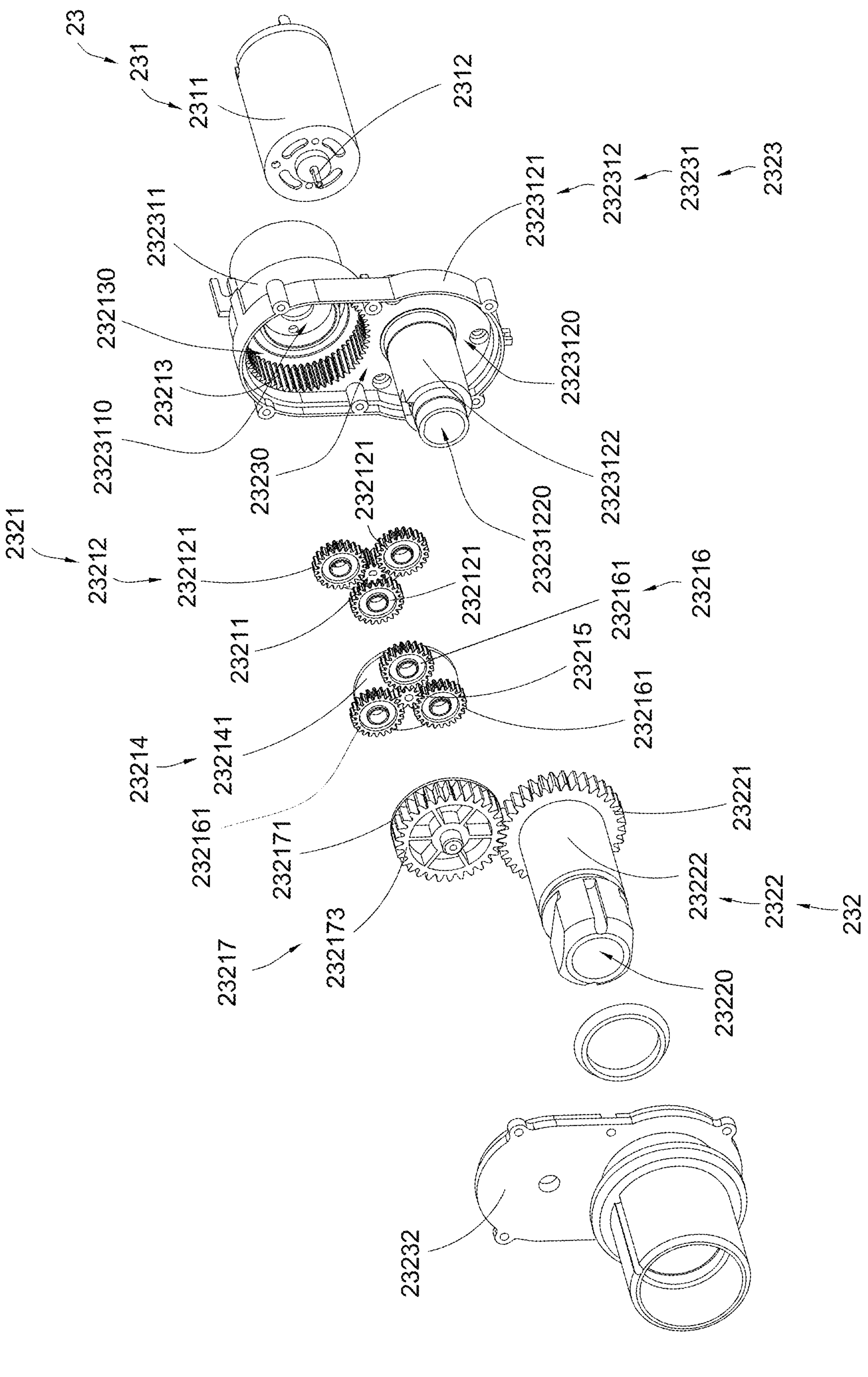
FIG. 7 is an exploded perspective view of a drive assembly of the electric cleaner according to the above first preferred embodiment of the present invention.

As shown in FIG. 7, the torque-enhancing assembly 2321 further comprises a first turntable 23214 that synchronously rotates with the first planetary gear set 23212. In detail, the first turntable 23214 comprises a first turntable body 232141 and a plurality of first planetary columns 232142, wherein each planetary column 232142 extends vertically from the first turntable body 232141. The first planetary gear set 23212 comprises a plurality of first planetary gears 232121, wherein each planetary gear 232121 mounts on a corresponding planetary column 232142 to rotate around the corresponding planetary column 232142. The first planetary gears 232121 are evenly distributed around the first sun gear 23211 and rotate synchronously around the first axis L1 as the first sun gear 23211 rotates. The fixed internal gear ring 23213 provides stable meshing support for the first planetary gears 232121 while guiding and transmitting their rotational motion to ensure precise orbit. As the first planetary gears 232121 orbit the first axis L1 defined by the first sun gear 23211, each first planetary gear 232121 simultaneously rotates on its corresponding planetary column 232142, creating a compound motion pattern. The motion of the first planetary gears 232121 drives the first planetary columns 232142 to rotate around the first axis L1, thereby driving the first turntable body 232141 to rotate synchronously.

According to the above first preferred embodiment of the present invention, the first turntable body 232141 and the first planetary column 232142 are integrally formed. This integrated design not only enhances structural stability but also reduces assembly errors, ensuring efficient power transmission.

The torque-enhancing assembly 2321 further comprises a second sun gear 23215 and a second planetary gear set 23216. The second sun gear 23215 and the first planetary column 232142 are positioned on opposite sides of the first turntable body 232141. The second sun gear 23215, the first turntable body 232141, and the first planetary column 232142 are integrally formed. As the first turntable body 232141 rotates, the second sun gear 23215 synchronously rotates around the first axis L1, thereby driving the second planetary gear set 23216 to rotate around the first axis L1.

The second planetary gear set 23216 rotates around the second sun gear 23215 and engages with the internal gear ring 23213, further enabling power transmission and torque amplification through speed reduction. In other words, the first planetary gear set 23212 shares the internal gear ring 23213 with the second planetary gear set 23216, forming a dual-engagement mechanism that not only enhances transmission efficiency but also boosts torque output.

Figure 8:
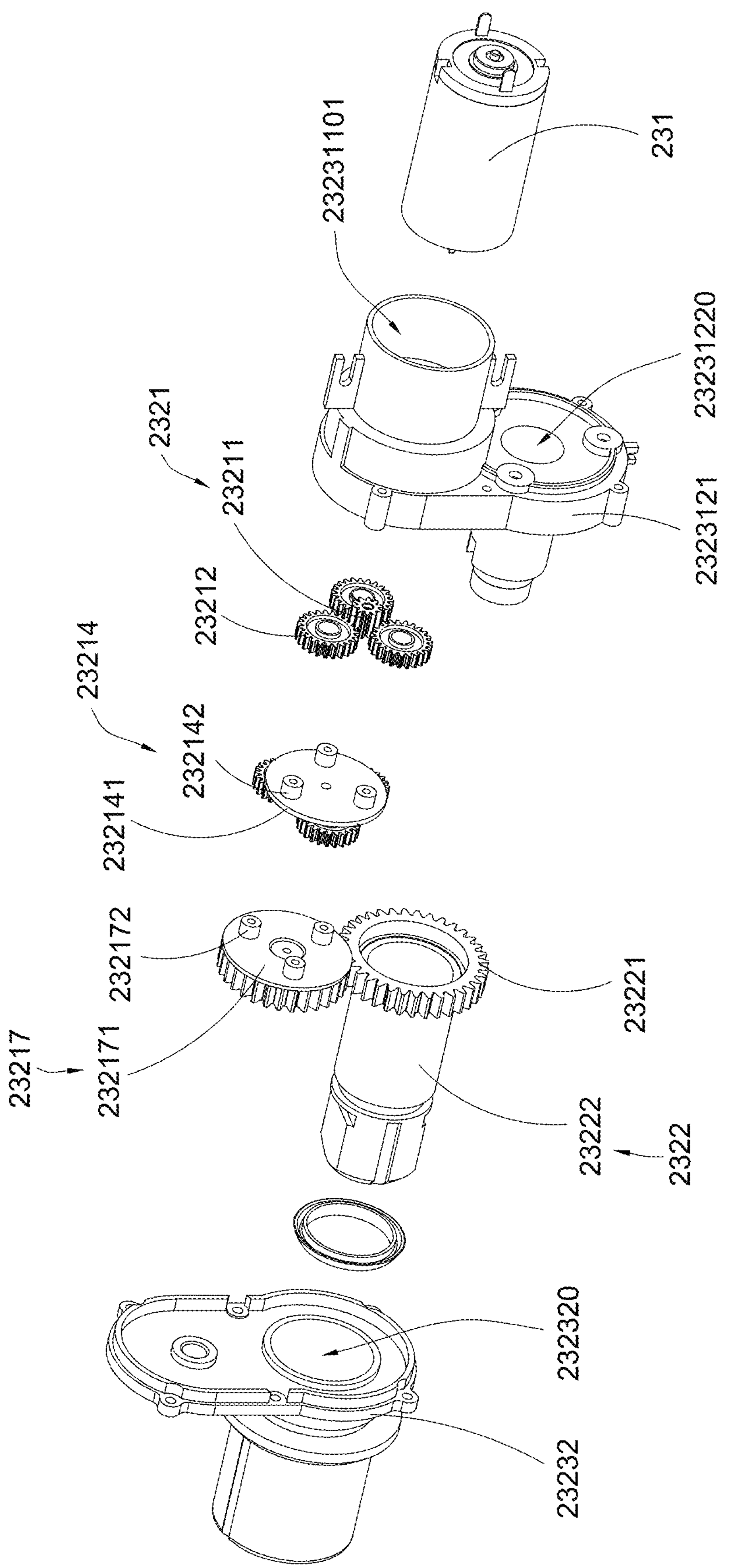
FIG. 8 is another exploded perspective view of the drive assembly according to the above first preferred embodiment of the present invention.
Figure 9:
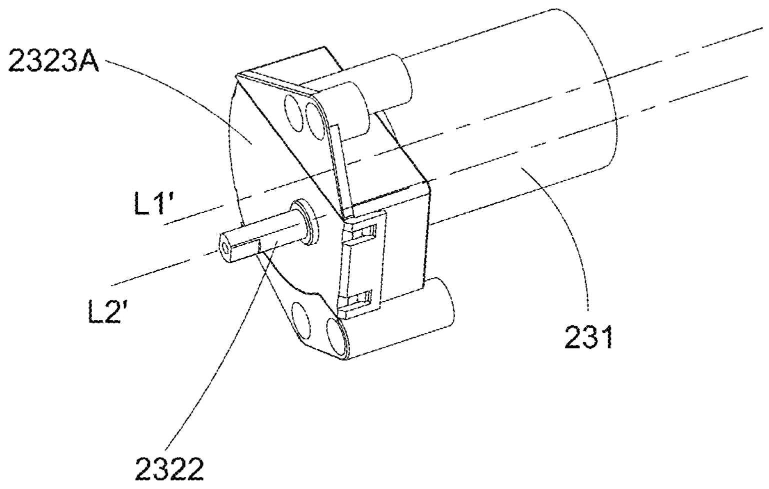
FIG. 9 illustrates an alternative mode of the drive assembly of the electric cleaner of the electric steam cleaner according to the above first preferred embodiment.
Figure 10:
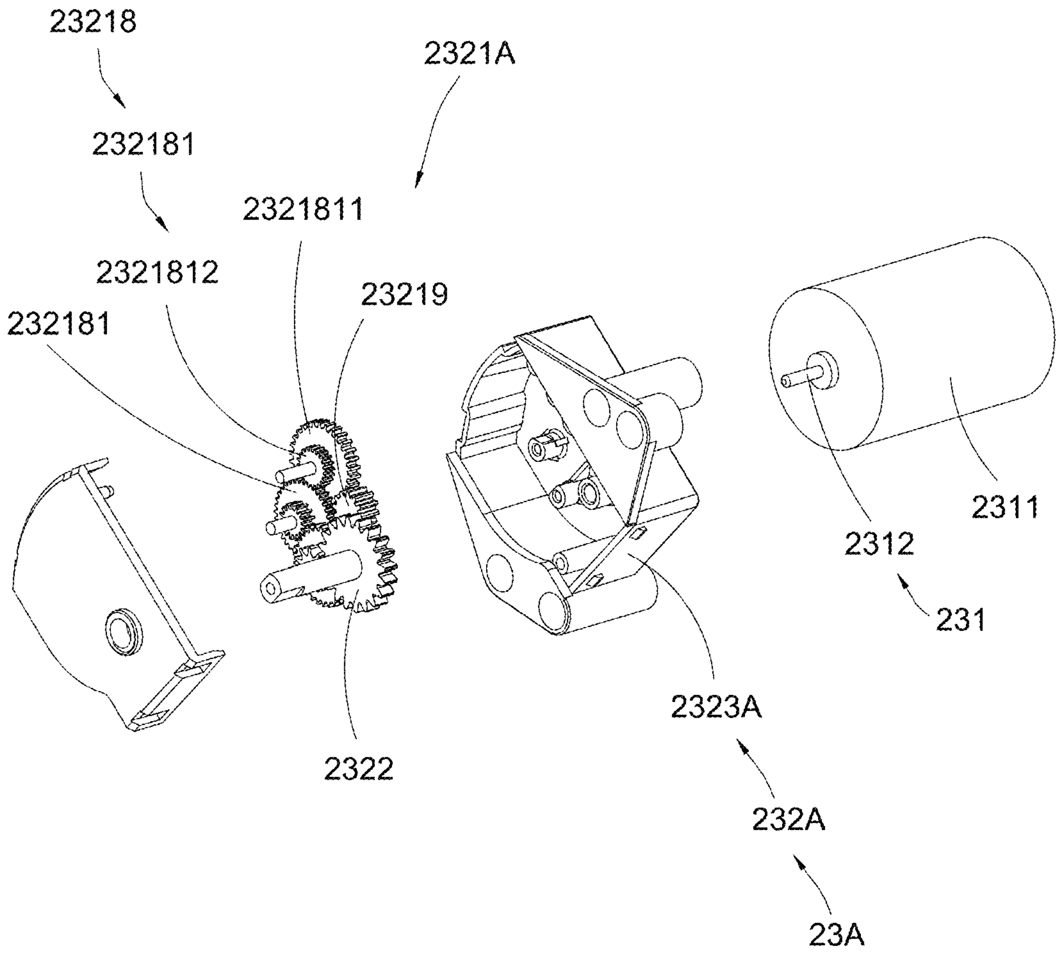
FIG. 10 is an exploded perspective view of the alternative mode of the drive assembly according to the above first preferred embodiment.
Figure 11:
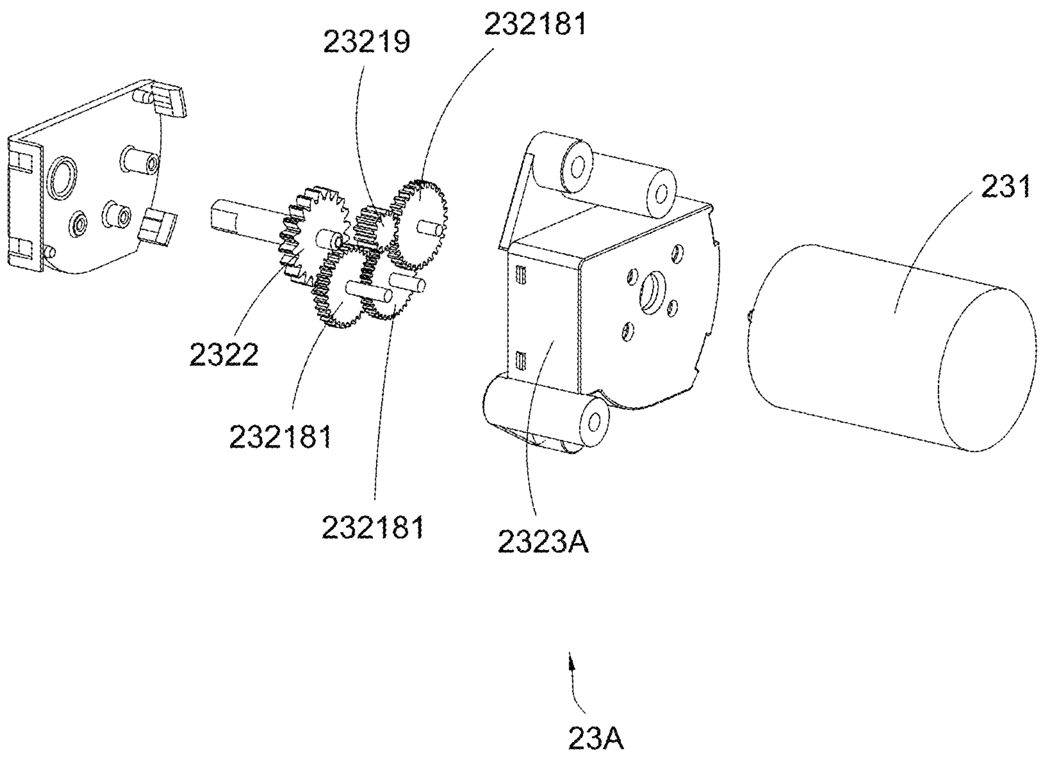
FIG. 11 is another exploded perspective view of the alternative mode of the drive assembly according to the above first preferred embodiment.
Figure 12:
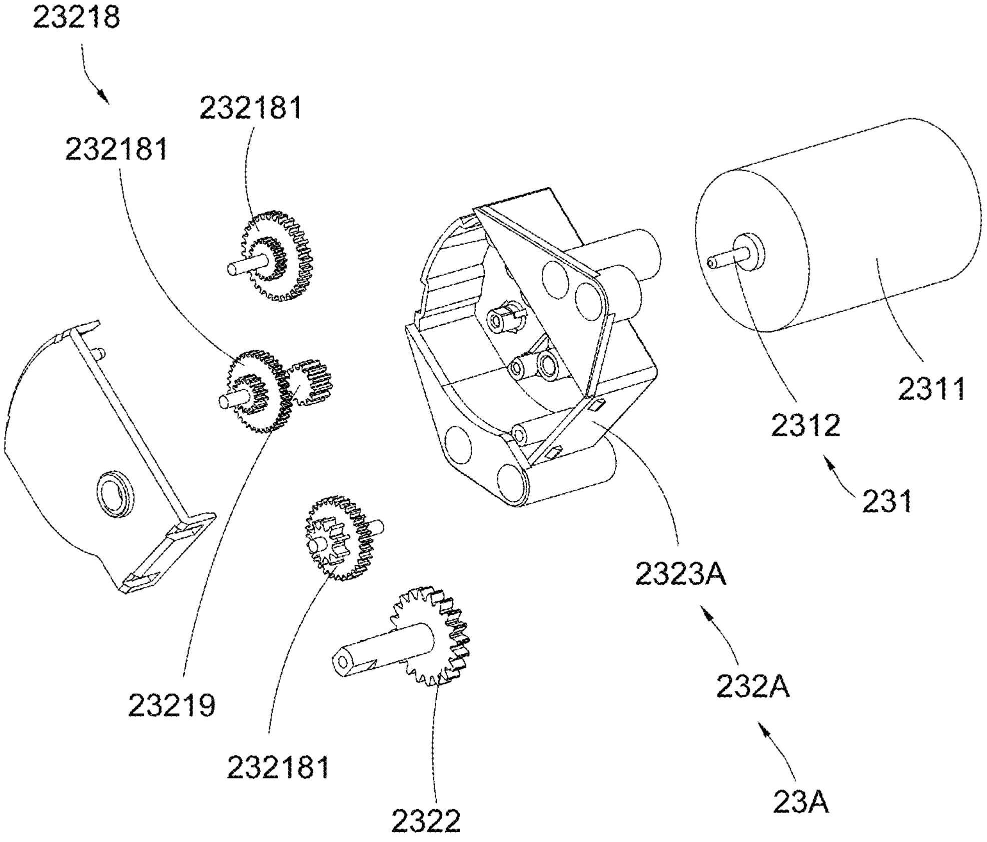
FIG. 12 is another exploded perspective view of the alternative mode of the drive assembly according to the above first preferred embodiment.

As shown in FIGS. 7 and 8, the torque-enhancing assembly 2321 further comprises a second turntable 23217 that rotates synchronously with the second planetary gear set 23216. In detail, the second turntable 23217 comprises a second turntable body 232171 and a plurality of second planetary columns 232172 extending vertically from the turntable body. The second planetary gear set 23216 comprises a plurality of second planetary gears 232161, wherein each second planetary gear 232161 is mounted on a corresponding second planetary column 23217 to rotate independently. The second planetary gears 232161 are evenly distributed around the second sun gear 23215 and rotate synchronously with the second sun gear 23215 about the first axis L1. Meanwhile, the internal gear ring 23213 remains stationary, providing stable engagement support for the second planetary gear set 23216 and guiding the transmitting motion of the second planetary gear set 23216. As the second planetary gears 232161 rotate around their respective second planetary columns 232171 while the second sun gear 23215 rotates around the first axis L1, so as to create compound motion through coordinated rotation. The movement of the second planetary gear 232161 drives the second planetary column 232172 to rotate around the first axis L1, and then drives the whole second turntable 23217 to rotate synchronously.

The second turntable 23217 further comprises an active gear 232173 which is integrally formed with the second planetary column 232172 on opposite sides of the second turntable body 232171. The motion of the second planetary gears 232161 drives the second planetary columns 232172 to rotate around the first axis L1, thereby rotating both the second turntable body 232171 and the active gear 232173. The active gear 232173 engages with the eccentric gear 23221 of the passive rotary body 2322. As the active gear 232173 rotates about the first axis L1, it drives the eccentric gear 23221 to rotate about the second axis L2. Simultaneously, the extension body 23222, integrally formed with the eccentric gear 23221, rotates about the second axis L2, thereby synchronously rotating the cleaning head 22 mounted on the extension body 23222.

The passive rotary body 2322 defines a rotor channel 23220, enabling the steam delivery system 21 to direct steam flow to the exterior of the cleaning head 22 without requiring rotational movement. The steam delivery system 21 comprises a connector 211, a conduit 212, and a steam injection assembly 213. The connector 211 connects to both the steam generator 10 and the conduit 212, transferring high-temperature steam from the steam generator 10 to the conduit 212. The conduit 212 then links the connector 211 to the steam injection assembly 213, so as to deliver the steam to the steam injection assembly 213, and sprays the steam onto an outer surface of the cleaning head 22.

The gear housing 2323 comprises a housing body 23231 and a housing cover 23232. The housing body 23231 comprises an active accommodation section 232311 and a passive accommodation section 232312, designed to accommodate and position the torque-enhancing assembly 2321 and the passive rotary body 2322, respectively. These two sections are fixed together to form the gear chamber 23230. In detail, the active accommodation section 232311 defines an active accommodation groove 2323110 with an active accommodation groove opening 23231101. The first sun gear 23211 is mounted on the rotating motor 231 and enters the active accommodation groove 2323110 through the active accommodation groove opening 23231101. The internal gear ring 23213 is formed in the active accommodation section 232311 of the gear housing 2323, defining an internal gear space 232130. The housing cover 23232 is attached to the housing body 23231, sealing the active accommodation groove 2323110 from the opposite side. The passive accommodation section 232312 has a passive accommodation groove 2323120 for housing the eccentric gear 23221 of the passive rotary body 2322. The passive accommodation groove 2323120 is in communication with the active accommodation groove 2323110 so that the active gear 232173 of the torque-enhancing assembly 2321 engages with the eccentric gear 23221 of the passive rotary body 2322 to achieve power transmission.

The housing cover 23232 defines a cover opening 232320. When installed on the housing body 23231, the cover opening 232320 aligns with the passive accommodation groove 2323120, allowing the extension body 23222 of the passive rotary body 2322 to extend outward from the passive accommodation groove 2323120. This configuration facilitates the installation of the cleaning head 22.

The passive accommodation section 232312 comprises a passive housing 2323121 and a tube shaft 2323122. The passive rotary body 2322 is rotatably mounted on the tube shaft 2323122, enabling smooth rotation around the tube shaft 2323122. In detail, the tube shaft 2323122 passes through the rotor channel 23220 and fits snugly with the internal structure of the passive rotary body 2322 to ensure stable rotation. The tube shaft 2323122 defines a steam pipe passage 23231220, within which the steam injection assembly 213 is securely fixed. This design prevents damage to the steam injection assembly 213 caused by the rotation of the passive rotary body 2322 while also avoiding interference from the movement of the passive rotary body 2322.

The passive accommodation groove 2323120 is arranged around the tube shaft 2323122 to form an annular space to provide a rotational path for the eccentric gear 23221.

The cover opening 232320 of the housing cover 23232 is in the opposite direction to the active accommodation groove opening 23231101 of the active accommodation groove 2323110 and opposite to the gear chamber 23230, so that the cleaning head 22 extends away from the rotating motor 231 in a direction deviating from the axis of the rotating motor 231.

The shell 24 comprises a steam passage section 241, a handle section 242, and a first connection section 243, wherein the steam passage section 241 and the handle section 242 arranged at a distance from each other. The steam passage section 241 allows the steam delivery system 21 to pass through, directing steam to the working area of the cleaning head 22. The handle section 242 is designed with a user-friendly grip size and shape, positioned at a distance from the steam passage section 241 to prevent heat from the steam delivery system 21 from causing discomfort during operation. The first connection section 243 connects the steam passage section 241 and the handle section 242, forming an integrated structure, so as to define a gripping space 240 where users can comfortably hold the device with their fingers, enhancing operational comfort. To facilitate rotation of the cleaning head 22, the steam passage section 241 and handle section 242 extend outward from the same side of the first connection section 243, forming a C-shaped extension. According to the above first preferred embodiment of the present invention, the shell 24 further comprises a second connection section 244, which integrates with the steam passage section 241 and handle section 242 to form an integral structure. The second connection section 244 is positioned opposite the first connection section 243. The first connection section 243 and the second connection section 244 are positioned opposite each other. The first connection section 243, the handle section 242, the second connection section 244, and the steam passage section 241 are sequentially connected and arranged around to form the gripping space 240, thereby further enhancing structural stability and overall strength.

The steam delivery system 21 is equipped with a steam delivery system channel 2410 defined by the steam passage section 241, which runs through the steam passage section 241 to accommodate the steam delivery system 21. The first connection section 243 has a first accommodation chamber 2430 designed to house both the eccentric transmission assembly 232 and the rotating motor 231 partially mounted on the active accommodation section 232311 of the eccentric transmission assembly 232. The first accommodation chamber 2430 is connected to the steam delivery system channel 2410, allowing the steam delivery system 21 to extend into the working area of the cleaning head 22.

The handle section 242 has a gripping chamber 2420 that connects to the first accommodation chamber 2430. The second connection section 244 defines a second accommodation chamber 2440, which communicates with both the gripping chamber 2420 and the steam delivery system channel 2410. The steam delivery system 21 sequentially passes through the second accommodation chamber 2440, the steam delivery system channel 2410, and the first accommodation chamber 2430, ultimately extending to the working area of the cleaning head 22.

The connector 211 establishes a detachable connection with the steam generator 10. One end of the conduit 212 connects to the connector 211, while the other end links to the steam injection assembly 213, which extends to the cleaning head 22. The connector 211 features a detachable cleaner attachment structure 2111. Correspondingly, the exhaust connector 12 of the steam generator 10 is equipped with an compatible detachable outlet connecting structure 121. Through a threaded connection, the connector 211 achieves quick disassembly and replacement with the steam generator 10.

It is worth mentioning that the detachable connection between connector 211 and steam generator 10 serves as an exemplary structure rather than a limitation. Other embodiments of the present invention may employ alternative designs for quick-release configurations. For instance, the connecting structure of the steam generator could feature protrusions while the connector 211 accommodates matching grooves for rotational engagement. Alternatively, the connecting structure of the steam generator might have recessed surfaces paired with corresponding protrusions on the connector, enabling rotational coupling. Another configuration involves the the connecting structure of the steam generator has button-shaped slots engaging with the connector's matching grooves during installation.

The connector 211 is constructed from a rigid anti-scald material to enable quick disassembly and assembly with the steam generator 10 while preventing excessive heat buildup on the outer surface of the second connection section 244. The conduit 212 is designed as a flexible conduit. The steam injection assembly 213 comprises an adapter 2131 and a nozzle 2132, where the adapter 2131 is securely mounted on the passive accommodation section 232312 of the gear housing 2323, wherein the nozzle 2132 is detachably attached to the adapter 2131. The adapter 2131 connects to the conduit 212, while the nozzle 2132 interfaces with the adapter 2131. Steam generated by the steam generator 10 is first channeled through the connector 211, then directed into the conduit 212, subsequently transmitted to the coupling of the steam injection assembly 213, and finally ejected from the nozzle 2132. In detail, the connector 211 defines a first steam passage 2110. The conduit 212 defines a second steam passage 2120 communicated with the first steam passage 2110. The steam injection assembly 213 has a third steam passage 2130 communicated with the second steam passage 2120. This configuration allows the steam generated by the steam generator 10 to sequentially pass through the three passages before exiting the nozzle 2132 of the steam injection assembly 213.

In more detail, the adapter 2131 defines an adapter channel 21310, while the nozzle 2132 has a injection channel 21320. These two channels are interconnected to form the third steam passage 2130. According to the above first preferred embodiment of the present invention, the adapter 2131 is made of rigid insulating material, wherein the nozzle 2132 is made of metal.

In detail, this electric steam cleaner defines a plurality of nozzle configurations (such as narrow slit, wide-mouth, or rotating types) to meet various cleaning needs, ensuring adaptability across different scenarios. Users simply need to align the required nozzle 2132 with the adapter 2131, then rotate and secure it for easy replacement.

Figure 4:
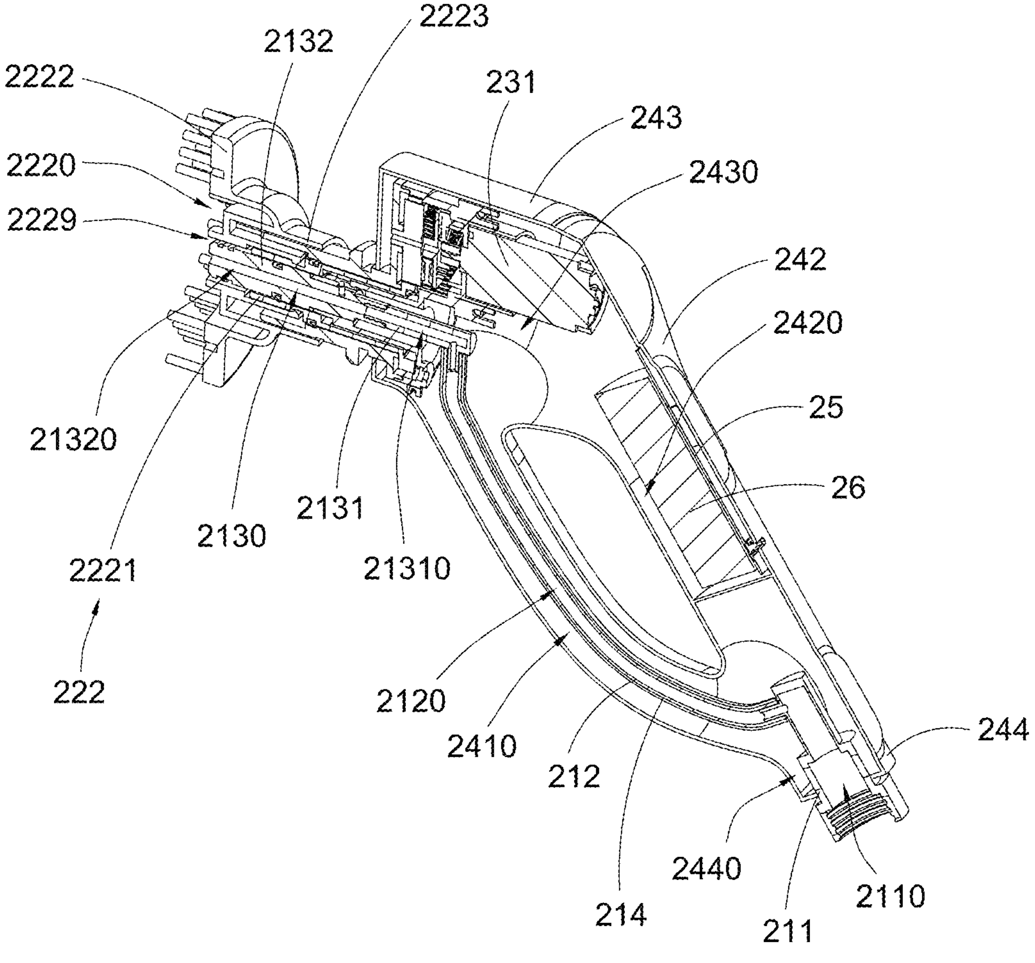
FIG. 4 is another cross-sectional view of the electric cleaner according to the above first preferred embodiment of the present invention.
Figure 5:
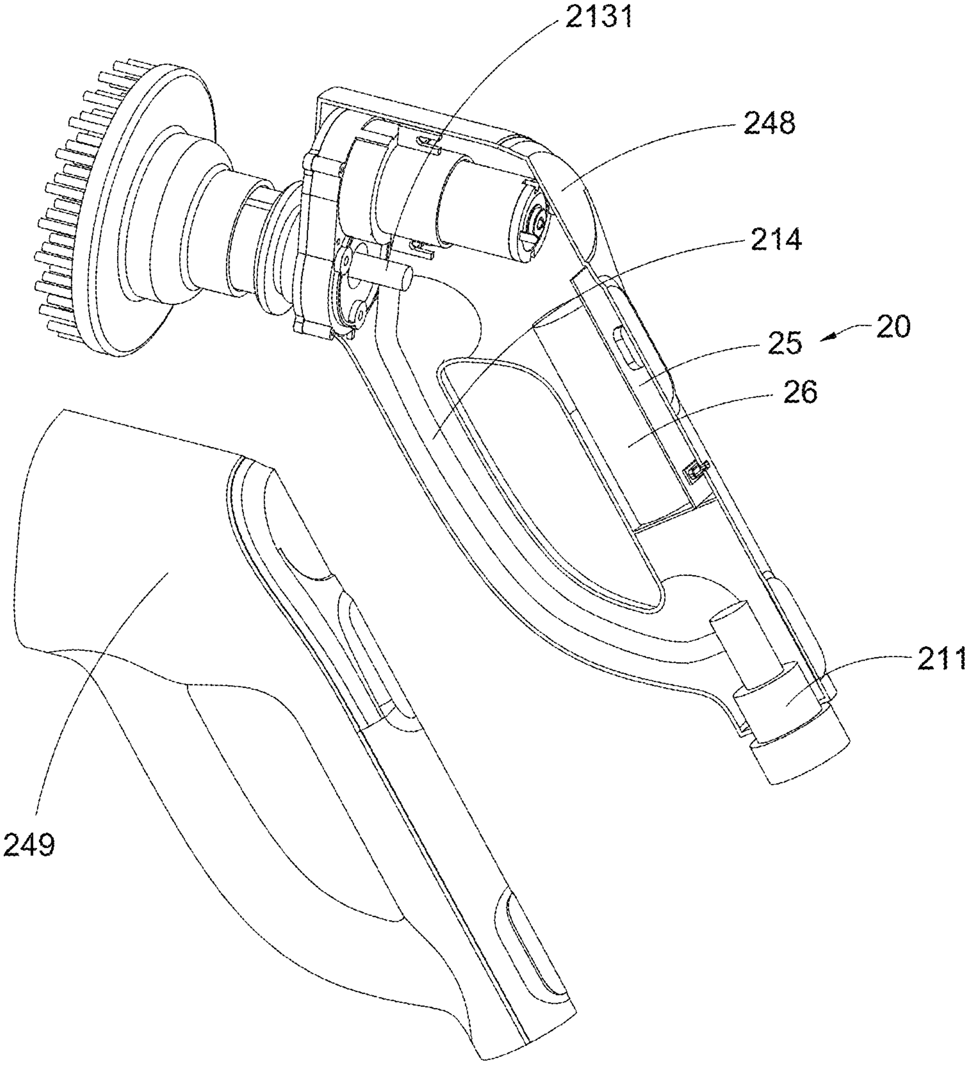
FIG. 5 is an exploded perspective view of the electric cleaner according to the above first preferred embodiment of the present invention.
Figure 6:
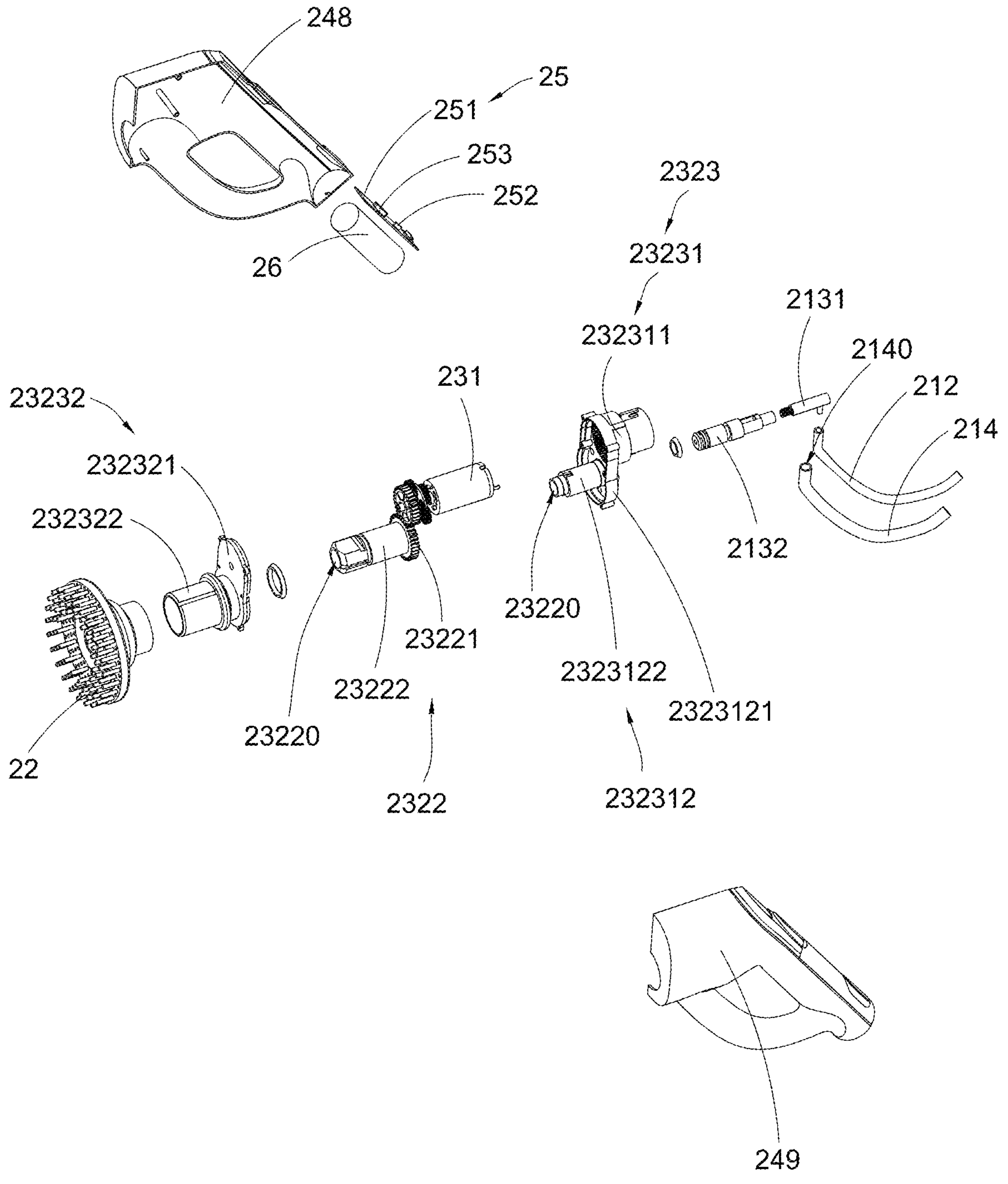
FIG. 6 is another exploded perspective view of the electric cleaner according to the above first preferred embodiment of the present invention.

As shown in FIG. 4, the connector 211 of the steam delivery system 21 is fixed within the second accommodating chamber 2440 of the second connection section 244. The conduit 212 connected to the connector 211 extends through a conduit passage 2140 defined by the insulating material 214 in the steam passage section 241. The steam injection assembly 213 connected to the conduit 212 passes through the steam pipe passage 23231220 of the eccentric transmission assembly 232 (fixed in the first accommodating chamber 2430 of the first connection section 243) and ultimately reaches the cleaning head 22.

The steam delivery system 21 extends between the first connection section 243 and the second connection section 244 via the steam passage section 241.

According to the above first preferred embodiment of the present invention, the shell 24 comprises a first half-shell 249 and a second half-shell 248. The first half-shell 249 and the second half-shell 248 are connected and fixed through a snap-fit structure, forming an integrated housing structure that combines the steam passage section 241, the handle section 242, the first connection section 243, and the second connection section 244 into a unified unit.

The electric cleaner 20 further comprises a control system 25 and a power supply unit 26 electrically connected to the rotating motor 231. The control system 25 manages the operating status of the rotating motor 231, while the power supply unit 26 provides power to both the rotating motor 231 and the control system 25. The control system 25 comprises a circuit board 251, a current detection module 252, and a control module 253. The current detection module 252 and the control module 25 are mounted on the circuit board 251 and electrically connected. The current detection module 252 continuously monitors the current flowing through the rotating motor 231. When the cleaning head 22 experiences external resistance causing load variations, the rotating motor 231 receives increased current. The current detection module 252 detects this current fluctuation in real time. If the current exceeds a predetermined threshold, the control module 253 automatically stops the rotating motor 231 to prevent overload damage. Additionally, the control module 253 adjusts the rotational speed of the rotating motor 231 according to different requirements, ensuring optimal performance on various object surfaces.

The circuit board 251 and the power supply unit 26 are both disposed in the gripping chamber 2420 of the handle section 242, so as to achieve spatial isolation with the conduit 212 disposed in the steam passage section 241 in the structural layout, thereby avoiding the influence of steam on the circuit components.

Furthermore, the steam delivery system 21 comprises an insulating material 214 positioned around the outer circumference of the conduit 212. This design effectively reduces heat transfer from steam to the shell 24 and other components, thereby enhancing overall safety and service life. The insulating material 214 is preferably selected for its high-temperature resistance and excellent thermal insulation properties.

Figure 2:
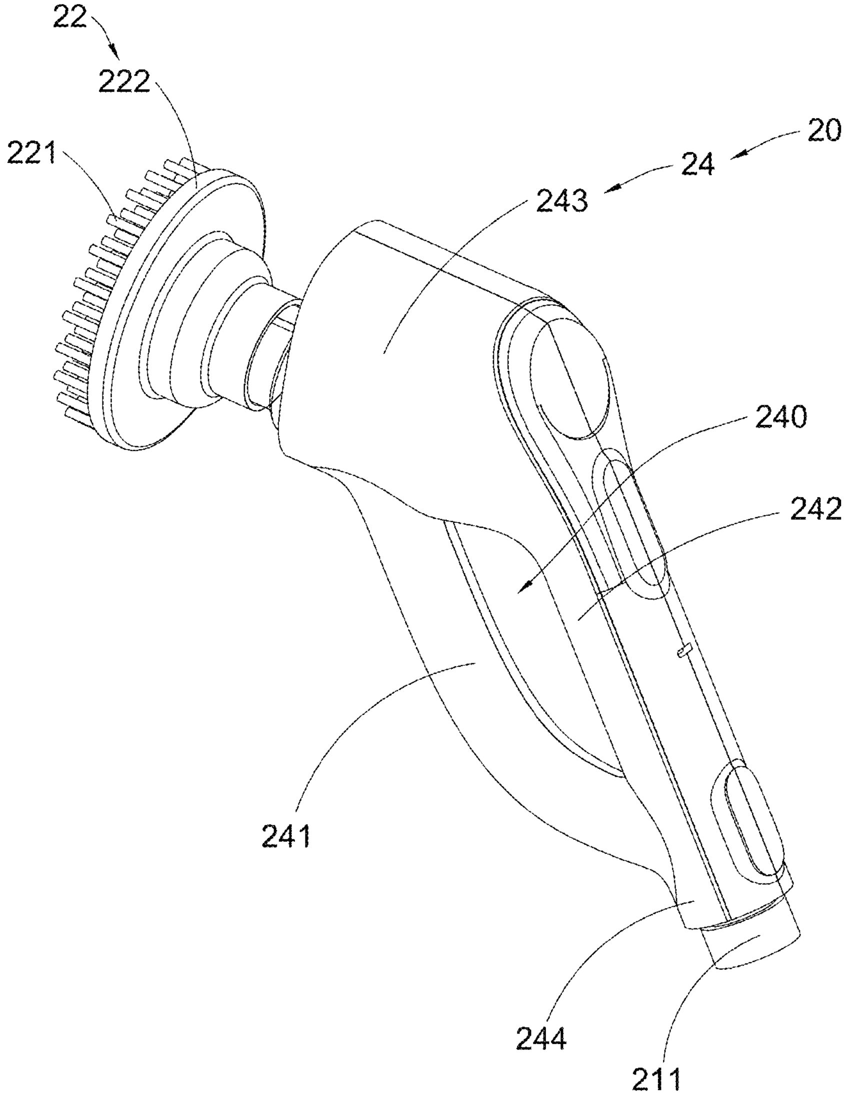
FIG. 2 is a perspective view of an electric cleaner according to the above first preferred embodiment of the present invention.
Figure 3:
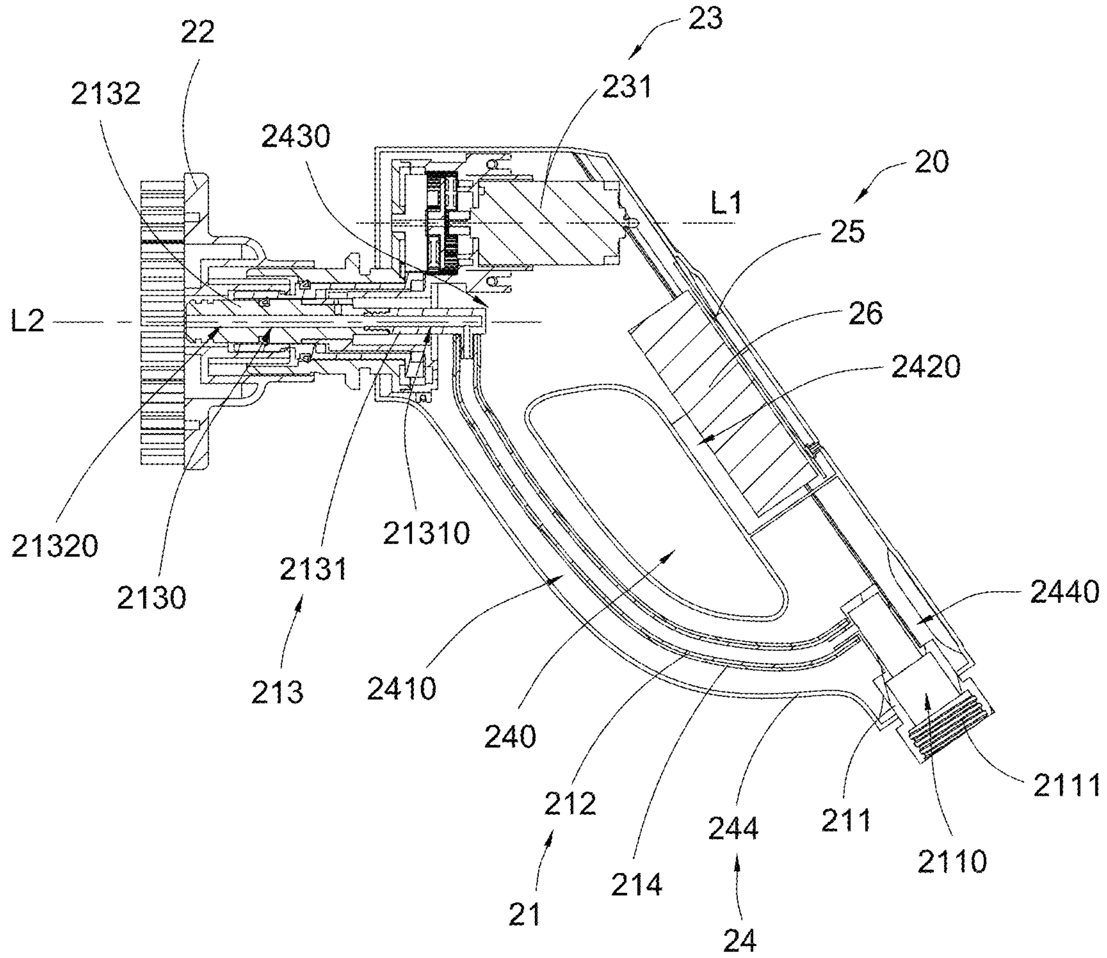
FIG. 3 is a cross-sectional view of the electric cleaner according to the above first preferred embodiment of the present invention.

As shown in FIGS. 1 and 2, the cleaning head 22 comprises a fixation body 222 and a brush body 221, with the brush body 221 mounted on the fixation body 222. The fixation body 222 is installed on the extension body 23222 of the passive rotary body 2322, enabling it to rotate along with the passive rotary body 2322 and drive the brush body 221 to spin. The brush body 221 comprises a plurality of bristle 2211 evenly distributed on its front surface, ensuring uniform cleaning during rotation. Inside the fixation body 222, there is a steam guide channel 2220 and a through hole 2229 connected to it. The nozzle 2132 of the steam injection assembly 213 passes through the through hole 2229, allowing high-temperature steam to be sprayed onto the cleaning surface. When the steam injection assembly 213 sprays steam through the through hole 2229, part of the steam enters the steam guide channel 2220 communicated to the through hole 2229. The steam guide channel 2220 serves to store heat and direct the steam flow, thereby enhancing cleaning efficiency.

According to the above first preferred embodiment of the present invention, the fixation body 222 of the cleaning head 22 is engaged with the eccentric transmission assembly 232 for quick disassembly connection, so as to facilitate the user to quickly replace different cleaning heads 22 to meet different cleaning requirements.

According to the above first preferred embodiment of the present invention, the housing cover 23232 comprises a cover plate 232321 and an extension cylinder 232322. The extension cylinder 232322 extends outward from one side of the cover plate 232321, defining the shell opening 232320. The cover plate 232321 is fixed to the active accommodation section 232311 of the housing body 23231, thereby defining the spatial position of the active accommodation groove 2323110 on one side of the active accommodation groove 2323110. In detail, the cover plate 232321 is fixed to the active accommodation section 232311 of the housing body 23231, defining the spatial position of the active accommodation groove 2323110 on the opposite side relative to the active accommodation groove opening 23231101. The extension cylinder 232322 is integrally formed with the cover plate 232321. The extension cylinder 232322 extends in the direction of the second axis L2. The extension cylinder 232322 is sleeved over the exterior of the extension body 23222 of the passive rotary body 2322, creating a gap between them to protect the passive rotary body 2322 from external influences while allowing smooth rotation.

The fixation body 222 of the cleaning head 22 comprises an engagement structure 2221, a bristle carrier 2222, and a protective sleeve 2223, all integrally formed. The bristle carrier 2222 supports and secures the bristles 2211 of the brush body 221. The engagement structure 2221 extends perpendicularly to the bristle carrier 2222 and is detachably connected via snap-fit components to the extension body 23222 of the passive rotary body 2322, enabling full rotation around the second axis L2. The cylindrical protective sleeve 2223 extends perpendicularly to the bristle carrier 2222, forming a protective barrier around the engagement structure 2221. This design prevents debris or liquids generated during operation from entering the drive assembly 23, thereby enhancing equipment durability and operational stability. When installed on the passive rotary body 2322, the engagement structure 2221 tightly engages with the extension body 23222. The extension body 23222 extends between the engagement structure 2221 and the protective sleeve 2223, maintaining clearance between the inner wall of the protective sleeve 2223 and the engagement structure 2221.

FIGS. 9 to 12 of the drawings illustrate an alternative mode of the drive assembly 23 of the electric steam cleaner according to the above first preferred embodiment of the present invention. Unlike the first preferred embodiment, the drive assembly 23A according to this alternative mode comprises a rotating motor 231 and an eccentric transmission assembly 232A. The eccentric transmission assembly 232A of the drive assembly 23 utilizes a tower gear structure to achieve torque amplification effects.

In detail, the eccentric transmission assembly 232A comprises a torque-enhancing assembly 2321A, a passive rotary body 2322, and a gear housing 2323A. The gear housing 2323A is designed to position and protect both the torque-enhancing assembly 2321A and the passive rotary body 2322. The torque-enhancing assembly 2321A features a tower-type gear structure. In detail, the torque-enhancing assembly 2321A comprises an driving gear 23219 and a transmission gear set 23218. The driving gear 23219 is mounted on the motor output shaft 2312 of the rotating motor 231, rotating around a first axis L1' as the motor body 2311 operates, thereby driving the transmission gear set 23218 for speed reduction. The transmission gear set 23218 comprises at least two meshing transmission gears 232181, each comprising a large gear 2321811 and a small gear 2321812. The large gear 2321811 is coaxially fixed to the small gear 2321812, with its number of teeth exceeding that of the small gear 2321812, achieving stepwise speed reduction and torque enhancement. The small gear 2321812 at the end of the transmission gear set 23218 engages with the passive rotary body 2322, causing it to rotate around a second axis L2'. The second axis L2' is parallel to and offset from the first axis L1', thereby realizing the purpose of offset transmission.

The drive assembly 23A comprises a plurality of interlocking gear units that transmit power step by step in accordance with a predetermined transmission ratio to achieve stable deceleration and torque increase of the output power of the rotating motor 231.

Figure 13:
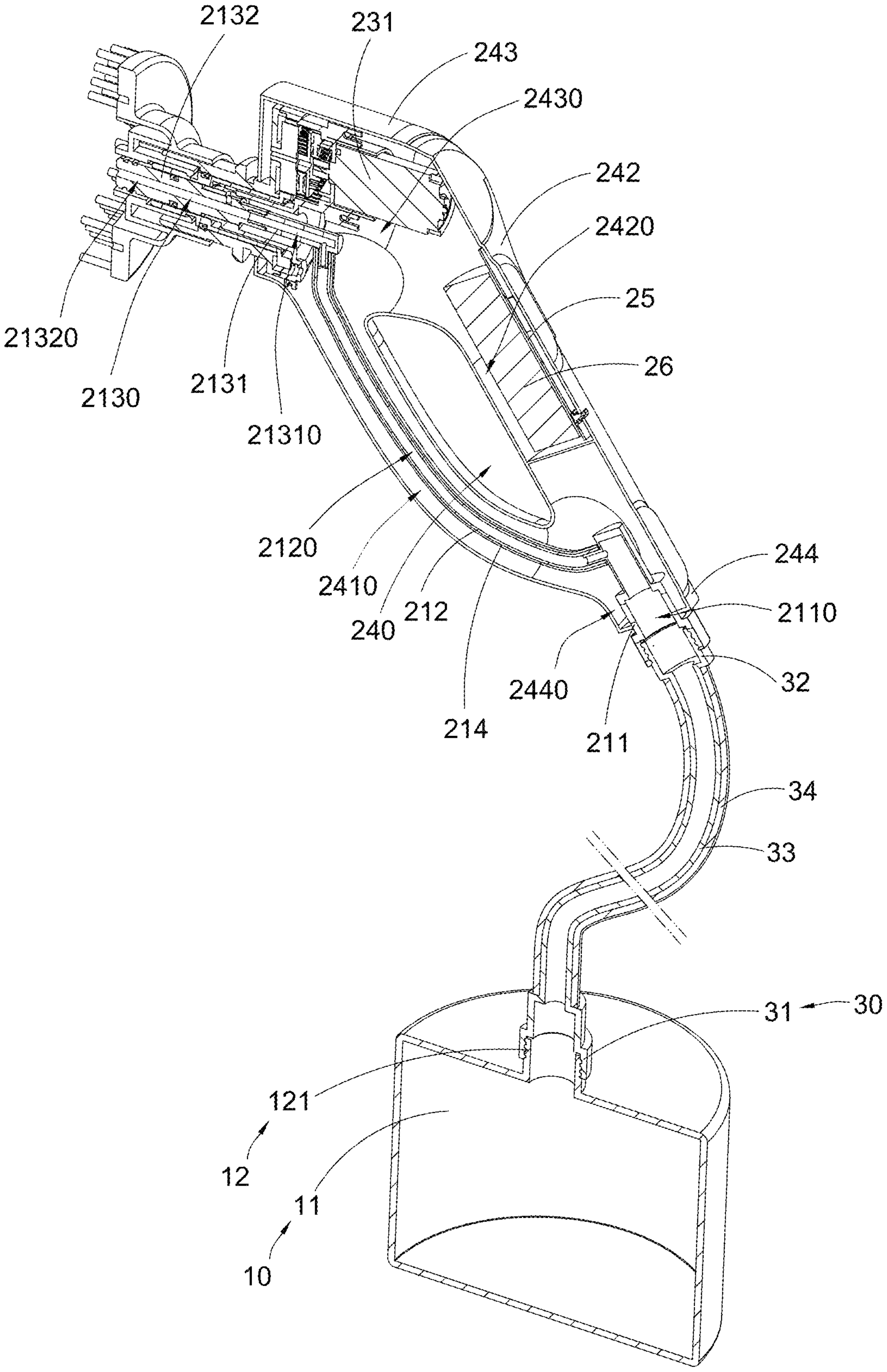
FIG. 13 is a cross-sectional view of an electric steam cleaner according to a second preferred embodiment of the present invention.

FIG. 13 illustrates an electric steam cleaner according to a second preferred embodiment of the present invention. Unlike the above first preferred embodiment where the electric cleaner 20 is directly connected to the steam generator 10, the electric steam cleaner comprises an extension tube 30. The extension tube 30 is detachably connected between the steam generator 10 and the electric cleaner 20 to extend the length of the steam delivery system 21, facilitating the cleaner's mobility. The extension tube 30 comprises a connection port 31, an output port 32, and a tube body 33 extending between the connection port 31 and the output port 32. The connection port 31 is communicated to the exhaust connector 12 of the steam generator 10, while the output port 32 is communicated to the connector 211 of electric cleaner 20. Additionally, the extension tube 30 comprises a protective sleeve 34 that encases the external surfaces of the connection port 31, output port 32, and tube body 33, providing both protection and thermal insulation.

One skilled in the art would understand, the connector 211 of the electric steam cleaner 20 can be configured to accommodate both the output port 32 of the extension tube 30 and the exhaust connector 12 of the steam generator 10. This dual compatibility allows users to choose between directly connecting the electric cleaner 20 to the steam generator 10 or using the extension tube 30, thereby enhancing both flexibility and convenience in operation.

Figure 14:
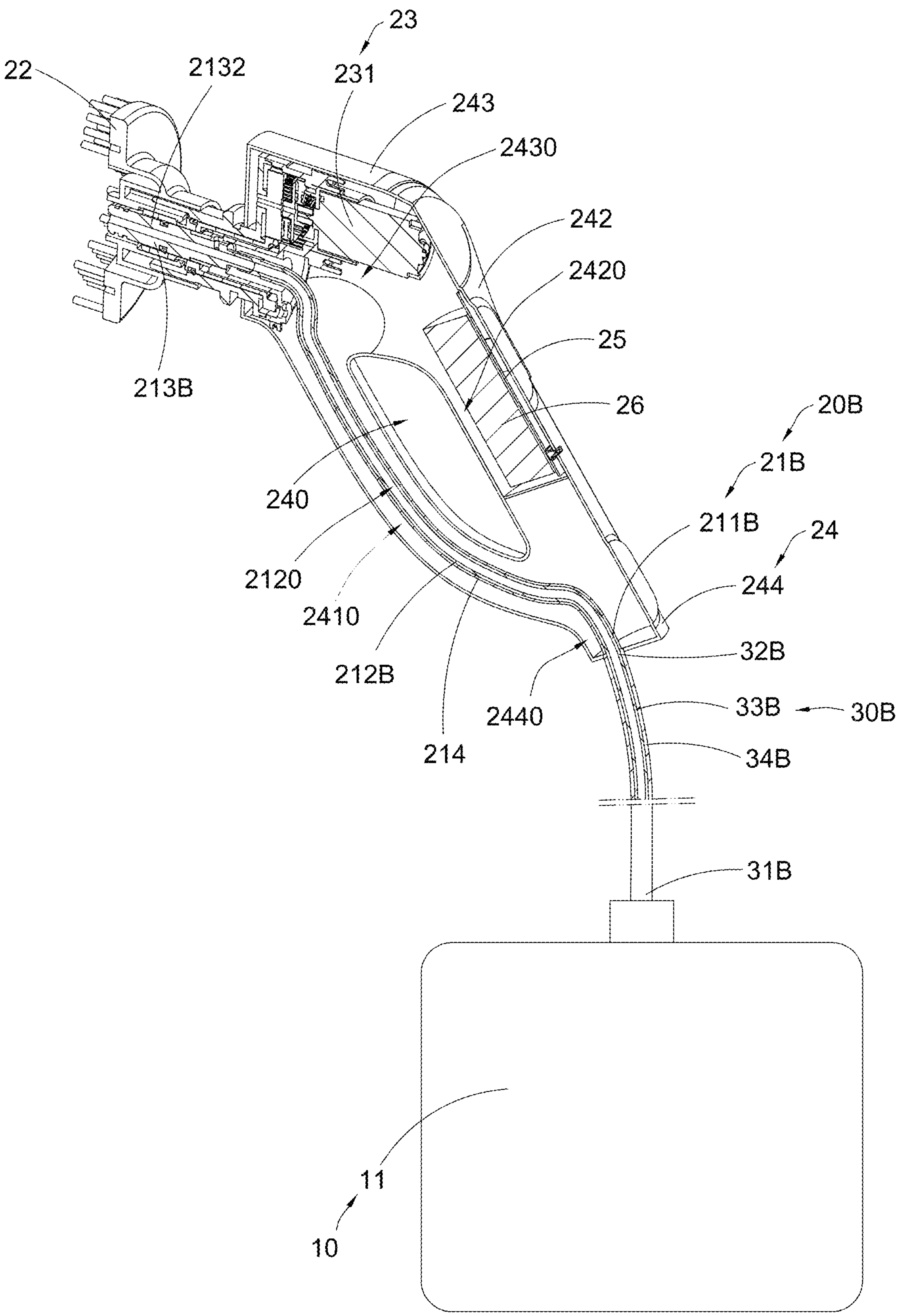
FIG. 14 is a cross-sectional view of an electric steam cleaner according to an alternative mode of the above second preferred embodiment above according to the present invention.
Figure 15:
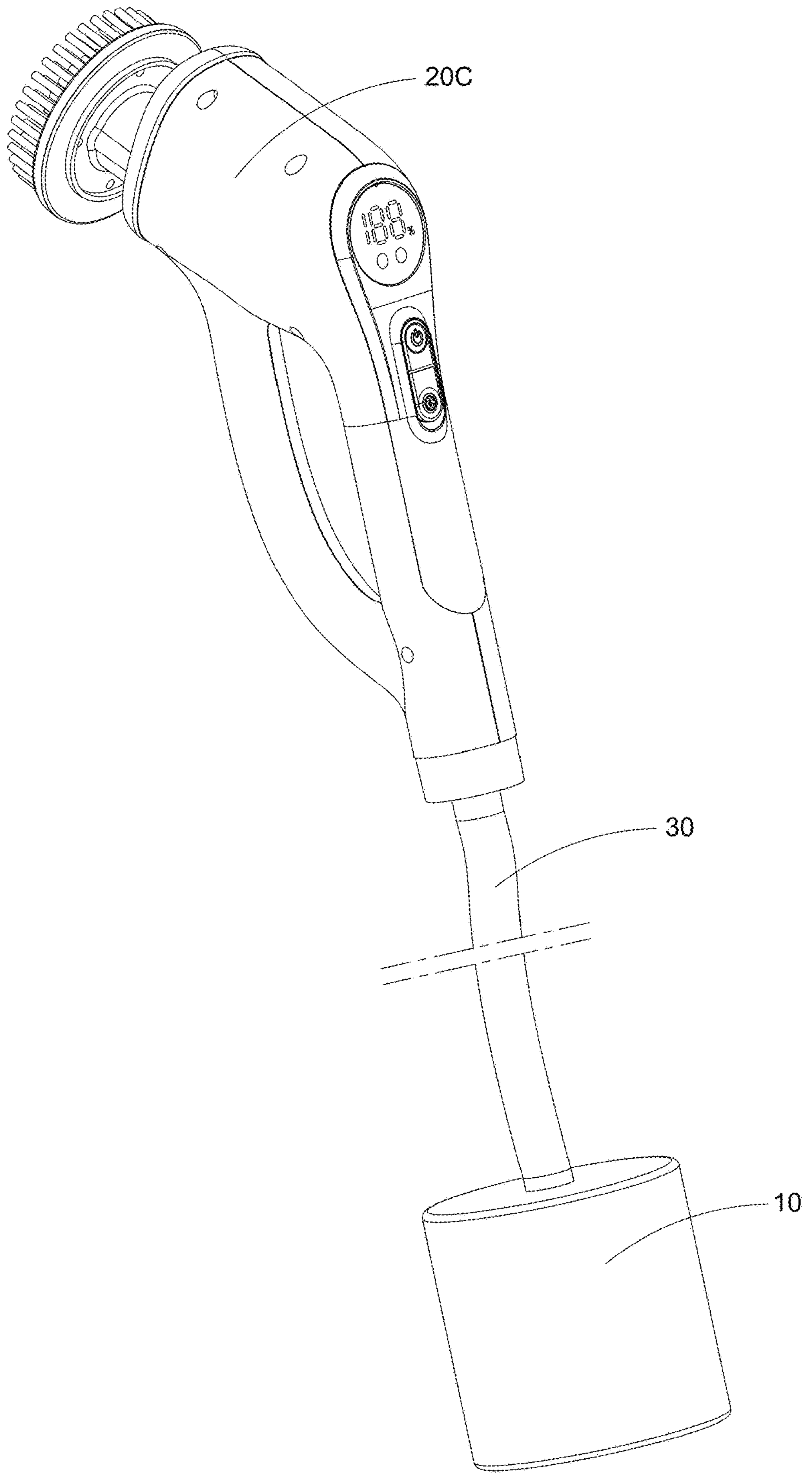
FIG. 15 is a perspective view of an electric steam cleaner according to a third preferred embodiment of the present invention.

FIG. 14 of the drawings illustrates an alternative mode of an electric steam cleaner according to the above second preferred embodiment of the present invention. The electric steam cleaner comprises a steam generator 10, an electric cleaner 20B, and an extension tube 30B. Unlike the detachable connection structure between the extension tube 30 and the electric cleaner 20 in the above second embodiment, the extension tube 30B is integrally fixedly connected to the electric cleaner 20B, while being detachably connected to the steam generator 10.

The electric cleaner 20B comprises a steam delivery system 21B, a cleaning head 22, a drive assembly 23, a shell 24, a control system 25, and a power supply unit 26. The steam delivery system 21B comprises a connector 211B, a conduit 212B, and metal steam injection assembly 213B. The conduit 212B is connected to the steam injection assembly 213B. The extension tube 30B comprises a connection port 31B, an output port 32B, a tube body 33B, and protective sleeve 34B, with the output port 32B being integrally connected to the connector 211B of the electric cleaner 20B. In detail, the conduit 212B, the connector 211B, and the extension tube 30B are formed from a single continuous tube, ensuring both sealing integrity and structural strength in the steam transmission path. The protective sleeve 34 is installed within the shell 24 of the electric cleaner 20B.

As can be understood by one skilled in the art, other embodiments of the present invention may also provide for the steam generator, electric cleaner, and extension tube to be integrally fixedly connected. Alternatively, the steam generation structure may be incorporated into the electric cleaner itself. The present invention is not limited to such configurations.

FIGS. 15 to 20 of the drawings illustrate an electric steam cleaner according to a third preferred embodiment of the present invention. The electric steam cleaner comprises a steam generator 10, an electric cleaner 20C, and an extension tube 30. The electric cleaner 20C can be directly connected to the steam generator 10 or connected via the extension tube 30, allowing users to make flexible choices based on practical needs during operation.

The electric cleaner 20C comprises a steam delivery system 21C, a cleaning head 22C, a drive assembly 23C, and a shell 24C. The steam delivery system 21C delivers steam generated by the steam generator 10C to the vicinity of the cleaning head 22C. The cleaning head 22C is electrically driven by the drive assembly 23C to rotate.

The drive assembly 23C comprises a rotating motor 231 and an eccentric transmission assembly 232C. Driven by the rotating motor 231, the eccentric transmission assembly 232C rotates the cleaning head 22C. In detail, the rotating shaft of the rotating motor 231 and the cleaning head 22C are parallel to each other while maintaining a second predetermined distance. This arrangement allows the steam delivery system 21C to deliver steam to a central axis position of the cleaning head 22C without interference, ensuring smooth operation.

The eccentric transmission assembly 232C comprises a torque-enhancing assembly 2321 and a passive rotary body 2322C. The torque-enhancing assembly 2321 is driven by the rotating motor 231 to rotate around a first axis L1" and subsequently drive the passive rotary body 2322C to rotate around a second axis L2", where the first axis L1" and the second axis L2" are parallel to each other. The first axis L1" passes through the motor rotation shaft of the rotating motor 231, while the second axis L2" passes through the cleaning head rotation shaft of the cleaning head 22C.

The torque-enhancing assembly 2321 is connected to the rotating motor 231 and the passive rotary body 2322C via gear transmission. The eccentric transmission assembly 232C further comprises a gear housing 2323C with a gear chamber 23230, where the torque-enhancing assembly 2321 is installed. This gear housing 2323C provides positioning and protection for the torque-enhancing assembly 2321.

The passive rotary body 2322C comprises an eccentric gear 23221 and an extension body 23222C. The eccentric gear 23221 engages with the gear of the torque-enhancing assembly 2321, thereby being driven to rotate by this component. The extension body 23222C extends from the eccentric gear 23221 in the direction of the second axis L2" to form a structure suitable for mounting the cleaning head 22C. When the eccentric gear 23221 is rotated by the torque-enhancing assembly 2321, the extension body 23222C rotates synchronously with the eccentric gear 23221, driving the cleaning head 22C to rotate in coordination. The extension body 23222C and the eccentric gear 23221 are integrally formed.

According to this third preferred embodiment of the present invention, the torque-enhancing assembly 2321 is configured as a planetary gear mechanism. This assembly achieves high-efficiency power transmission through the precision meshing of an internal gear ring, planetary gears, and a sun gear, ensuring stable operation of the cleaning head 22C at lower speeds with high torque output while improving cleaning performance. In detail, the torque-enhancing assembly 2321 comprises a first sun gear 23211, a first planetary gear set 23212, and an internal gear ring 23213. The first sun gear 23211 is connected to the rotating motor 231 and rotates synchronously with it during operation. The first planetary gear set 23212 rotates around the first sun gear 23211 while meshing with the internal gear ring 23213, thereby transmitting power and reducing speed while increasing torque. The rotating motor 231 comprises a motor body 2311 and a motor output shaft 2312, which extends from the housing to rotate with it. The extension direction of the motor output shaft 2312 corresponds to the orientation of the first axis L1". The motor output shaft 2312 is rigidly connected to the first sun gear 23211, transmitting the power of the rotating motor 231 to the torque-enhancing assembly 2321. Through the rotation of the first sun gear 23211, the first planetary gear set 23212 is driven to orbit around the first sun gear 23211 and engage with the internal gear ring 23213 at the same time, so as to realize the efficient transmission of power and the reduction of speed, and increase the output torque.

Figure 18:
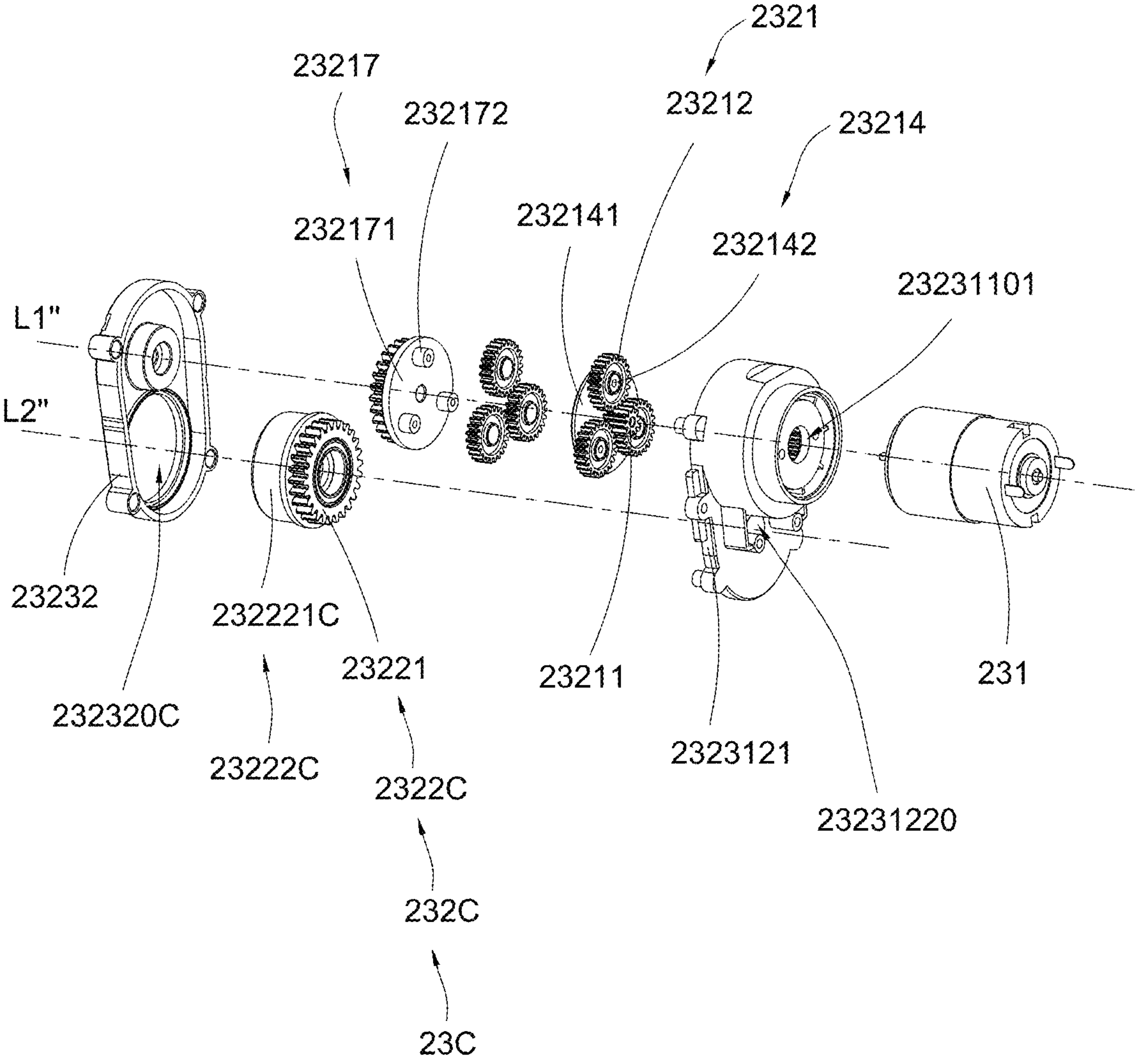
FIG. 18 is another exploded perspective view of the electric cleaner of the electric steam cleaner according to the above third preferred embodiment of the above present invention.
Figure 19:
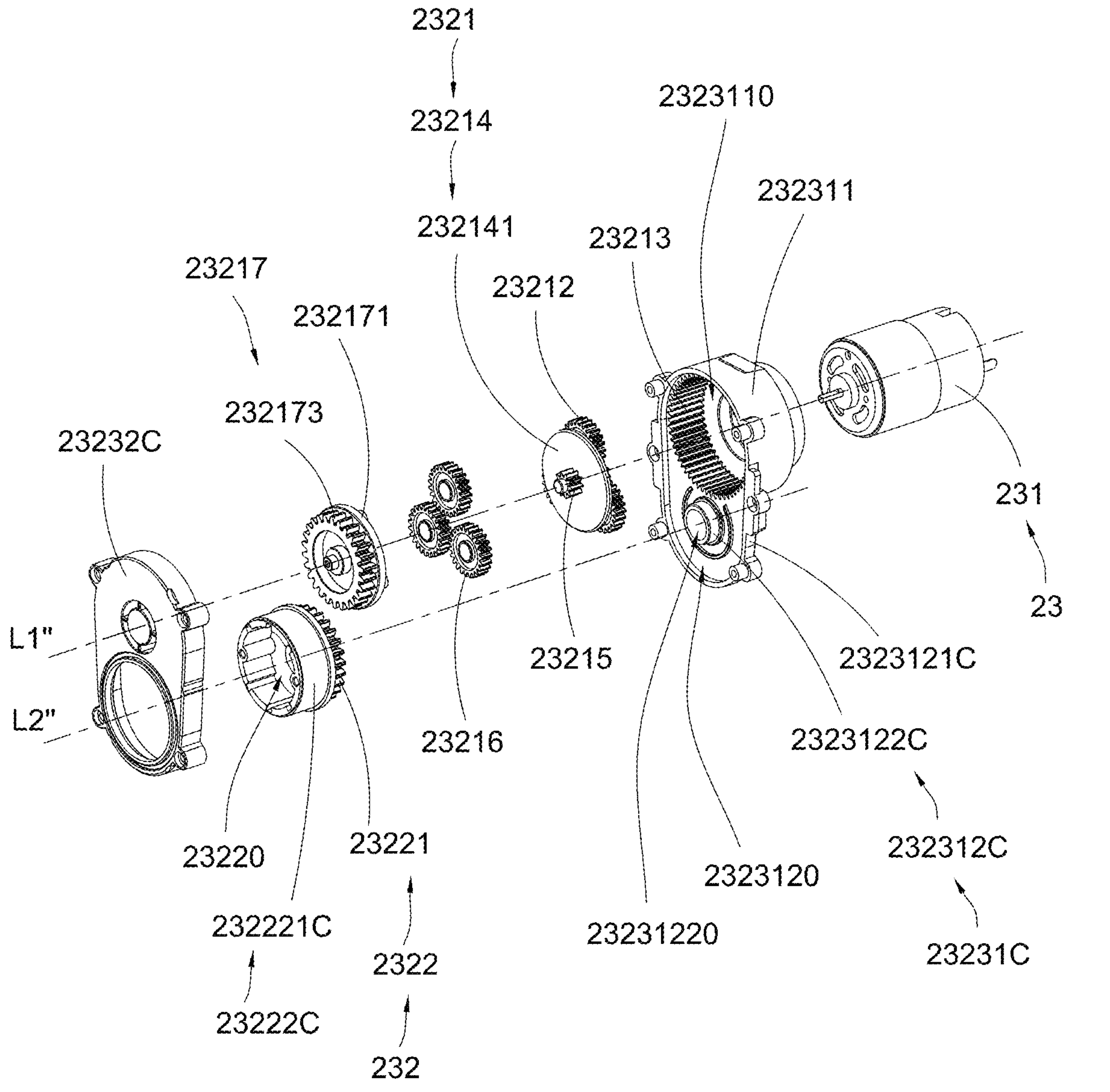
FIG. 19 is an exploded perspective view of a drive assembly of the electric cleaner according to the above third preferred embodiment of the present invention.

Referring to FIGS. 18 and 19, the torque-enhancing assembly 2321 further comprises a first turntable 23214 that rotates synchronously with the first planetary gear set 23212. In detail, the first turntable 23214 comprises a first turntable body 232141 and a plurality of first planetary columns 232142 extending vertically from the first turntable body 232141. The first planetary gear set 23212 comprises a plurality of first planetary gears 232121, each mounted on corresponding first planetary columns 232142 to rotate around them. These first planetary gears 232121 are evenly distributed around the first sun gear 23211 and rotate synchronously with it along the first axis L1" as the first sun gear 23211 rotates. The internal gear ring 23213 remains stationary, providing stable engagement support for the first planetary gears 232121 and ensuring their rotational path. While the first planetary gears 232121 orbit around the first sun gear 23211 via the first axis L1", each first planetary gear 232121 simultaneously rotates on its corresponding first planetary column 232142, creating compound motion. This combined movement drives the first planetary column 232142 to rotate around the first axis L1" and consequently drives the synchronous rotation of the first turntable body 232141.

According to this third preferred embodiment of the present invention, the first turntable body 232141 and the first planetary column 232142 are integrally formed. The integral molding design not only improves the structural stability, but also reduces the assembly error and ensures the efficiency of power transmission.

The torque-enhancing assembly 2321 further comprises a second sun gear 23215 and a second planetary gear set 23216. The second sun gear 23215 and the first planetary column 232142 are positioned on opposite sides of the first turntable body 232141. The second sun gear 23215, the first turntable body 232141, and the first planetary column 232142 are integrally formed. As the first turntable body 232141 rotates, the second sun gear 23215 synchronously rotates around the first axis L1" and subsequently drives the second planetary gear set 23216 to rotate around the same shaft.

The second planetary gear set 23216 rotates around the second sun gear 23215 and engages with the internal gear ring 23213, further enabling power transmission and torque amplification through speed reduction. In other words, the first planetary gear set 23212 shares the internal gear ring 23213 with the second planetary gear set 23216, forming a dual-engagement mechanism that not only enhances transmission efficiency but also boosts torque output.

Referring to FIGS. 18 and 19, the torque-enhancing assembly 2321 further comprises a second turntable 23217 that rotates synchronously with the second planetary gear set 23216. In detail, the second turntable 23217 comprises a second turntable body 232171 and a plurality of second planetary columns 232172 extending vertically from the turntable body. The second planetary gear set 23216 comprises a plurality of second planetary gears 232161, each mounted on a corresponding second planetary column 232172 to rotate independently. These second planetary gears 232161 are evenly distributed around the second sun gear 23215 and rotate synchronously with it about the first axis L1". Meanwhile, the internal gear ring 23213 remains stationary, providing stable engagement support for the second planetary gear set 23216. As the second planetary gears 232161 rotate around the second sun gear 23215 via the first axis L1", each second planetary gear 232161 simultaneously rotates around its respective second planetary column 232172, creating compound motion. This rotational movement drives the second planetary column 23217 to rotate around the first axis L1", thereby enabling synchronized rotation of the entire second turntable 23217.

The second turntable 23217 further comprises a active gear 232173, which is integrally formed with the second planetary column 232172 on opposite sides of the second turntable body 232171. The rotation of the second planetary gears 232161 drives the second planetary columns 232172 to rotate around the first axis L1", thereby rotating the second turntable body 232171 and the active gear 232173 (integrated with the second turntable body 232171) around the same axis. The active gear 232173 engages with the eccentric gear 23221 on the driven rotating body 2322C. When the active gear 232173 rotates around the first axis L1", it drives the eccentric gear 23221 to rotate around the second axis L2". Simultaneously, the extension body 23222C (integrated with the eccentric gear 23221) rotates around the second axis L2", synchronizing the rotation of the cleaning head 22C mounted on the extension body.

The passive rotary body 2322C defines a rotor channel 23220, enabling the steam delivery system 21C to direct steam toward the outer surface of the cleaning head 22C without rotating with the assembly. In detail, the steam delivery system 21C comprises a connector 211C, a conduit 212, and a steam injection assembly 213C. The connector 211C connects to both the steam generator 10C and the conduit 212, transmitting high-temperature steam generated in the steam generator 10 to the conduit 212. The conduit 212 links the connector 211C to the steam injection assembly 213C. The high-temperature steam is then channeled through the steam injection assembly 213C and sprayed onto the outer surface of the cleaning head 22C.

The gear housing 2323C comprises a housing body 23231C and a housing cover 23232C. The housing body 23231C comprises an active accommodation section 232311 and a passive accommodation section 232312C, designed to accommodate and position the torque-enhancing assembly 2321 and the passive rotary body 2322C, respectively. These two sections are fixed together to form the gear chamber 23230. In detail, the active accommodation section 232311 defines an active accommodation groove 2323110 with an active accommodation groove opening 23231101. The first sun gear 23211 is mounted on the rotating motor 231 and enters the active accommodation groove 2323110 through the active accommodation groove opening 23231101. An internal gear ring 23213 is formed in the active accommodation section 232311 of the gear housing 2323C, defining an internal gear space 232130 that forms part of the active accommodation groove 2323110. The housing cover 23232C is fixed to the housing body 23231C, sealing the active accommodation groove 2323110 from the opposite side of the active accommodation groove opening 23231101. The passive accommodation section 232312C contains a passive accommodation groove 2323120 designed to accommodate the eccentric gear 23221 of the passive rotary body 2322C. The passive accommodation groove 2323120 is in communication with the active accommodation groove 2323110 so that the active gear 232173 of the torque-enhancing assembly 2321 engages with the eccentric gear 23221 of the passive rotary body 2322C to achieve power transmission.

The housing cover 23232C defines a cover opening 232320C. When installed on the housing body 23231C, the cover opening 232320C aligns with the passive accommodation groove 2323120. This alignment allows the extension body 23222C of the passive rotary body 2322C to extend outward from the passive accommodation groove 2323120, thereby facilitating the installation of the cleaning head 22C.

The passive accommodation section 232312C comprises a passive housing 2323121C and a tube shaft 2323122C. The passive rotary body 2322C is rotatably mounted on the tube shaft 2323122C, enabling smooth rotation around the tube shaft 2323122C. In detail, the tube shaft 2323122C passes through the rotor channel 23220 and fits snugly with the internal structure of the passive rotary body 2322C to ensure stable rotation. The tube shaft 2323122C defines a steam pipe passage 23231220, within which the steam injection assembly 213C is securely fixed. This design prevents damage to the steam injection assembly 213C caused by the rotor's rotation while also avoiding interference from the rotor's movement.

The passive accommodation groove 2323120 is arranged around the tube shaft 2323122C to form an annular space to provide a rotational path for the eccentric gear 23221.

The direction of the housing cover opening 232320C is opposite to the direction of the active accommodation groove opening 23231101 and opposite to the gear chamber 23230, so that the cleaning head 22C extends away from the rotating motor 231 in a direction deviating from the axis of the rotating motor 231.

The shell 24C comprises a steam passage section 241, a handle section 242, and a first connection section 243. The steam passage section 241 is spaced apart from the handle section 242 to accommodate the steam pipe of the steam conduit system 21C, which directs steam to the working area of the cleaning head 22C. The handle section 242 is designed with dimensions and shape for user-friendly gripping, maintaining separation from the steam passage section 241 to prevent thermal discomfort from high-temperature steam pipes. The first connection section 243 connects both the steam passage section 241 and handle section 242, forming an integrated structure. These components collectively define a gripping space 240 where users can comfortably thread their fingers through for operation. To facilitate rotation of the cleaning head 22C, the steam passage section 241 and handle section 242 extend outward from the same side of the first connection section 243, creating a C-shaped extension. In the above third preferred embodiment of this invention, the shell 24C further comprises a second connection section 244 that integrates with both the steam passage section 241 and handle section 242. The second connection section 244 is positioned opposite the first connection section 243. The first connection section 243 is positioned opposite to the second connection section 244. These components including the first connection section 243, handle section 242, second connection section 244, and the steam passage section 241 are sequentially connected and enclose the gripping space 240, thereby enhancing structural stability and overall strength.

The steam delivery system 21 is equipped with a steam delivery system channel 2410 through the steam passage section 241, which runs through the steam passage section 241 to accommodate the steam pipeline of the steam delivery system 21C. The first connection section 243 contains a first accommodation chamber 2430 that houses both the eccentric transmission assembly 232C and the rotating motor 231 partially mounted on the active accommodation section 232311 of the eccentric rotation transmission assembly 232. This first accommodation chamber 2430 is connected to the steam delivery system channel 2410, allowing the steam pipeline of the steam delivery system 21C to extend into the working area of the cleaning head 22C.

The handle section 242 contains a gripping chamber 2420 that connects to the first accommodation chamber 2430. The second connection section 244 defines a second accommodation chamber 2440, which interconnects with both the gripping chamber 2420 and the steam delivery system channel 2410. The steam delivery system 21C sequentially passes through the second accommodation chamber 2440, the steam delivery system channel 2410, and the first accommodation chamber 2430, ultimately extending to the working area of the cleaning head 22C.

The steam delivery system 21C comprises a connector 211C, a conduit 212, and a steam injection assembly 213C. The connector 211C establishes a detachable connection with the steam generator 10C. One end of the conduit 212 connects to the connector 211C, while the other end links to the steam injection assembly 213C, which extends to the cleaning head 22C. The connector 211C features a detachable cleaner attachment structure 2111, while the exhaust connector 12 of the steam generator 10C is equipped with a compatible detachable connecting structure 121. The detachable connection between the connector 211C and steam generator 10C utilizes a rotational snap-fit mechanism, enabling quick installation and replacement.

It is worth mentioning that the detachable connection between connector 211C and steam generator 10C serves as an exemplary but not restrictive model for such detachable structures. In other embodiments of the present invention, the connector 211C and steam generator 10C may employ alternative structural designs optimized for rapid disassembly and assembly.

Figure 17:
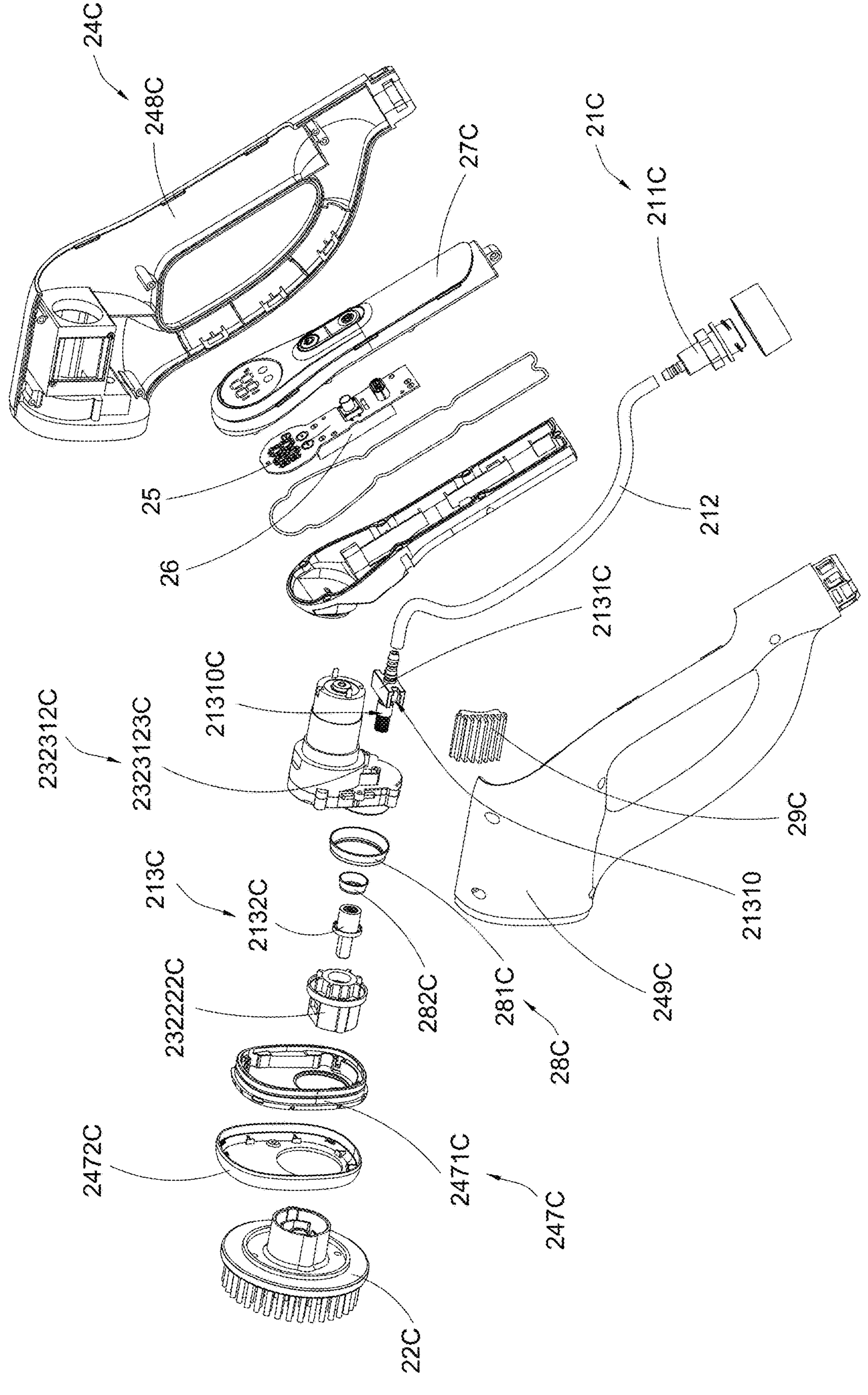
FIG. 17 is an exploded perspective view of the electric cleaner according to the above third preferred embodiment of the present invention.

The connector 211C is constructed from a rigid, heat-resistant material to facilitate quick disassembly and assembly with the steam generator 10C while preventing excessive temperature buildup on the outer surface of the second connection section 244. The conduit 212 is designed as a flexible conduit. The steam injection assembly 213C comprises an adapter 2131C and a nozzle 2132, where the adapter 2131C is fixed to the passive accommodation section 232312C of the gear housing 2323C, and the nozzle 2132 is detachably mounted on the adapter 2131C. As shown in FIG. 17, the passive accommodation section 232312C further comprises a pair of spaced positioning pillars 2323123C that extend integrally from the passive housing 2323121C. Correspondingly, the adapter 2131C defines an adapter channel 21310C. Each positioning pillar 2323123C engages into its corresponding adapter channel 21310C to secure the adapter 2131C within the passive accommodation section 232312C. The adapter 2131C connects to the conduit 212, while the nozzle 2132 interfaces with the adapter 2131C. Steam generated by the steam generator 10C is first discharged to the connector 211C, then transferred through the conduit 212 to the coupling of the steam injection assembly 213C, subsequently reaching the nozzle 2132 for final ejection. In detail, the connector 211C defines a first steam passage 2110C. The conduit 212 contains a second steam passage 2120 connected to this first steam passage 2110C. The steam injection assembly 213C is equipped with a third steam passage 2130C linked to the second steam passage 2120. Steam generated by the steam generator 10C sequentially flows through the first, second, and third passages before being expelled from the nozzle 2132 of the steam injection assembly 213. This sequential flow mechanism enables efficient steam cleaning of target areas.

In more detail, the adapter 2131C defines an adapter channel 21310C, while the nozzle 2132 has an injection channel 21320. These two channels are interconnected to form the third steam passage 2130C. According to this third preferred embodiment of the present invention, the adapter 2131C is made of rigid insulating material, wherein the nozzle 2132 is made of metal.

In detail, this electric steam cleaner can be equipped with a plurality of nozzles 2132 (e.g., narrow-gauge, wide-mouth, or rotary nozzles) to meet various cleaning needs. Users simply align the required nozzle 2132 with the mounting position on adapter 2131C and rotate it to secure, completing the replacement process.

Figure 16:
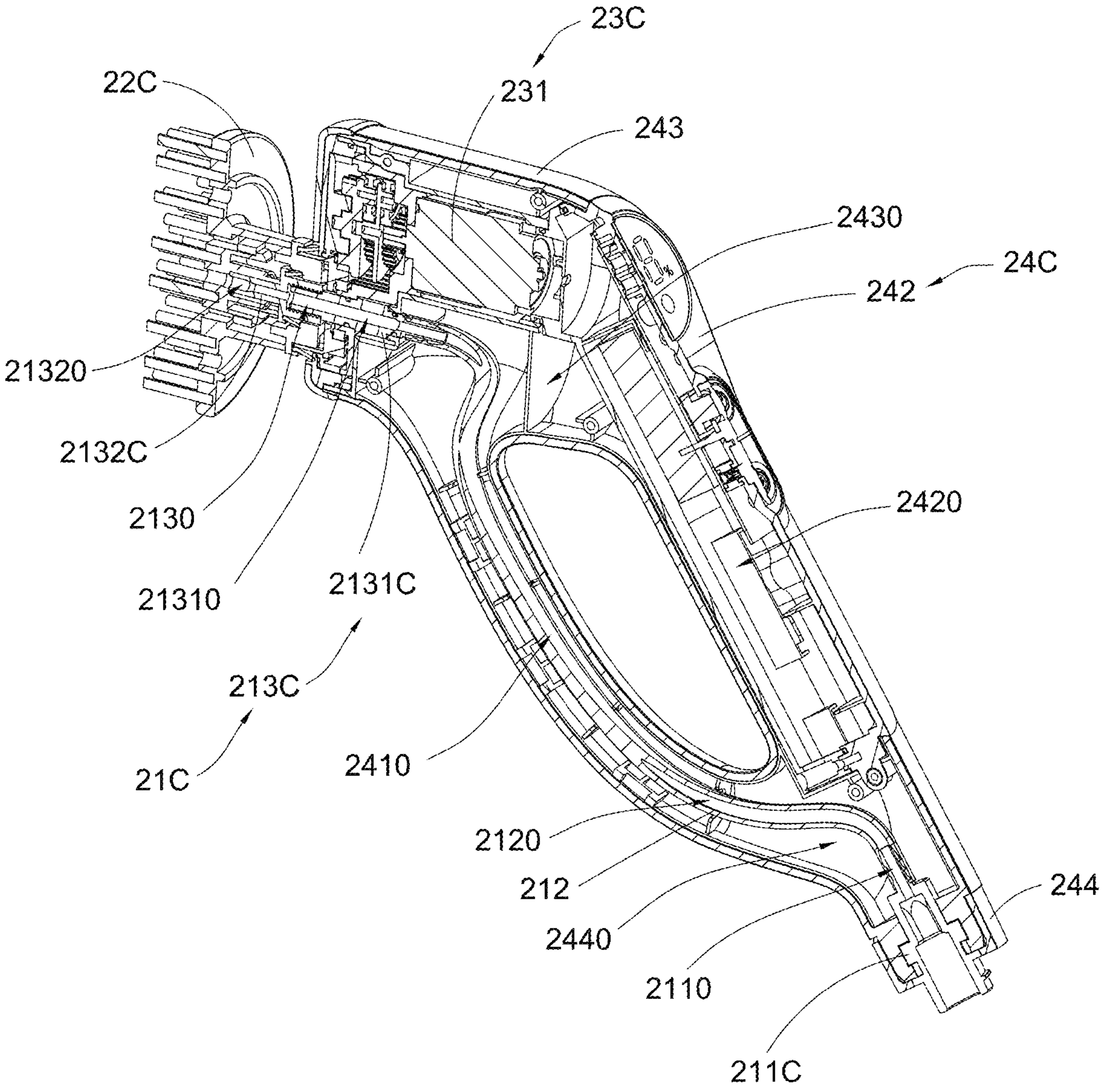
FIG. 16 is a cross-sectional view of an electric cleaner of the electric steam cleaner according to the above third preferred embodiment of the present invention.

As shown in FIG. 16, the connector 211C of the steam delivery system 21C is securely mounted within the second accommodating chamber 2440 of the second connection section 244. The conduit 212 connected to the connector 211C extends through the steam passage 2140 in the steam passage section 241. The steam injection assembly 213C, linked to the conduit 212, passes through the steam pipe passage 23231220 of the tube shaft 2323122C from the eccentric transmission assembly 232C (fixed in the first accommodation chamber 2430 of the first connection section 243), ultimately reaching the cleaning head 22C.

The steam delivery system 21C extends between the first connection section 243 and the second connection section 244 via the steam passage section 241. In detail, these components are positioned on the same side of the first connection section 243, creating sufficient space on the opposite side for the rotating cleaning of the cleaning head 22C.

According to this third preferred embodiment of the present invention, the shell 24C comprises a first half-shell 249C, a second half-shell 248C, and a front cover 247C. The first half-shell 249C and the second half-shell 248C are connected via a snap-fit mechanism. The front cover 247C seals the opening formed by the snap-fitted structure of the first half-shell 249C and the second half-shell 248C, thereby forming an integrated housing structure that combines the steam passage section 241, the handle section 242, the first connection section 243, and the second connection section 244. The front cover 247C comprises a sealing cap 2471C and a protective cap 2472C. The sealing cap 2471C is sealed at the opening of the snap-fitted structure between the first half-shell 249C and the second half-shell 248C, while the protective cap 2472C is mounted on the outer side of the sealing cap 2471C.

The electric cleaner 20 further comprises a control system 25 and a power supply unit 26 electrically connected to the rotating motor 231. The control system 25 manages the operating status of the rotating motor 231, while the power supply unit 26 provides power to both the rotating motor 231 and the control system 25. The control system 25 comprises a circuit board 251, a current detection module 252, and a control module 253. These components are mounted on the circuit board 251 and electrically connected. The current detection module 252 continuously monitors the current flowing through the rotating motor 231. When the cleaning head 22C experiences external resistance causing load variations, the rotating motor 231 receives increased current. The current detection module 252 detects this current fluctuation in real time. If the current value exceeds a predetermined threshold, the control module 253 automatically stops the rotating motor 231 to prevent overload damage. Additionally, the control module 253 adjusts the rotational speed of the rotating motor 231 according to different cleaning modes, ensuring optimal performance on various material surfaces.

The circuit board 251 and the power supply unit 26 are both arranged in the gripping chamber 2420 of the handle section 242, so as to achieve spatial isolation with the conduit 212 arranged in the steam passage section 241 in the structural layout, so as to avoid the influence of steam on the circuit components.

The electric cleaner 20C further comprises an electronic component protection shell 27C, in which the control system 25 and the power supply unit 26 are assembled inside the electronic component protection shell 27C.

Figure 20:
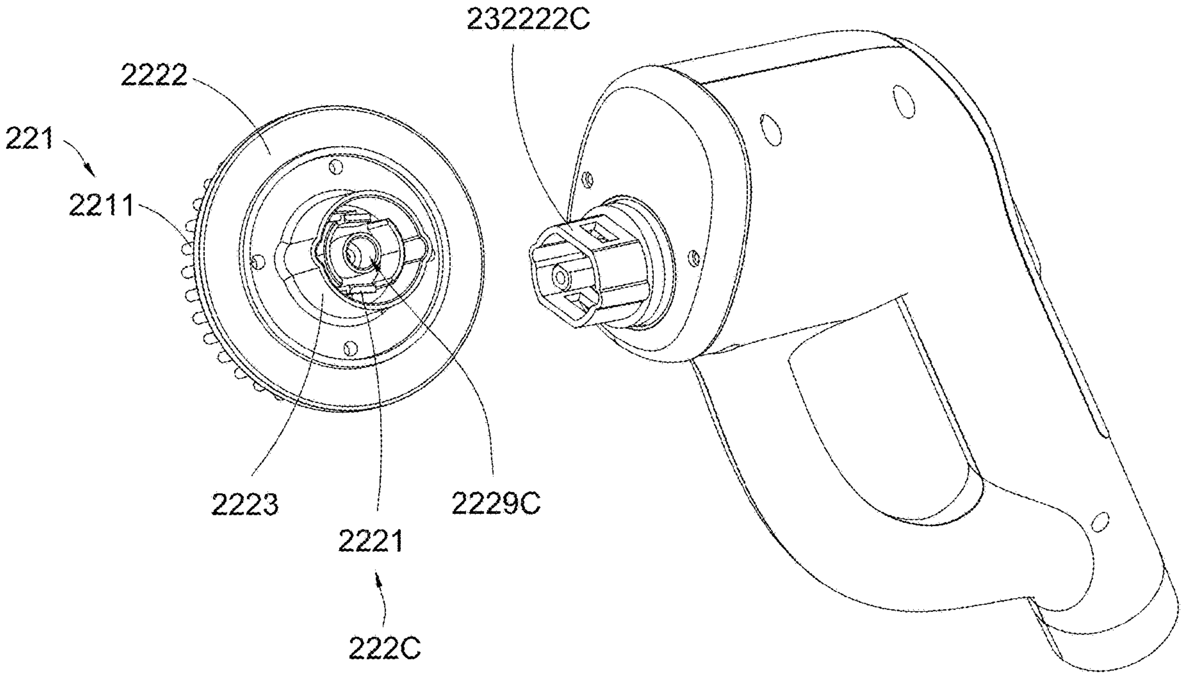
FIG. 20 is another exploded perspective view of the electric cleaner according to the above third preferred embodiment of the present invention.

As shown in FIG. 20, the cleaning head 22C comprises a fixation body 222C and a brush body 221, with the brush body 221 mounted on the fixation body 222C. The fixation body 222C is attached to an extension body 23222C of the passive rotary body 2322C, allowing it to rotate with the movement of the passive rotary body 2322C and drive the brush body 221. The brush body 221 contains a plurality of bristles 2211 evenly distributed across its front surface, ensuring thorough cleaning of surfaces during rotation. The fixation body 222C defines a through hole 2229C through which the nozzle 2132 of the steam injection assembly 213C passes, enabling high-temperature steam to be effectively sprayed onto the cleaning surface.

According to the above third preferred embodiment of the present invention, the fixation body 222C of the cleaning head 22C is fast-disconnectable with the adapter 232222C, thereby enabling users to quickly replace different cleaning heads 22C to meet different cleaning needs.

According to this third preferred embodiment of the present invention, the housing cover 23232C defines the cover opening 232320C. The housing cover 23232C defines the spatial configuration of the active accommodation groove 2323110 on one side of the active accommodation groove 2323110. The fixation body 222C of the cleaning head 22C comprises a engagement structure 2221, a bristle carrier 2222, and a protective sleeve 2223, all integrally formed. The bristle carrier 2222 supports and secures the bristles 2211 of the brush body 221. The engagement structure 2221 extends perpendicular to the bristle carrier 2222 and is detachably connected to the extension body 23222C of the passive rotary body 2322C via a latching mechanism, enabling the entire cleaning head 22C to rotate around the second axis L2". The cylindrical protective sleeve 2223, extending perpendicularly to the bristle carrier 2222, forms a protective barrier around the engagement structure 2221. This design prevents debris or liquid generated during cleaning from entering the drive assembly 23C, thereby significantly enhancing the equipment's service life and operational stability. When the cleaning head 22C is mounted on the passive rotary body 2322C, the engagement structure 2221 securely fastens to the extension body 23222C. The extension tube 232322 extends between the engagement structure 2221 and the protective tube 2223, maintaining a gap between the protective tube 2223 and the engagement structure 2221.

As shown in FIGS. 17 and 18, the extension body 23222C of the passive rotary body 2322C comprises an extension main body 232221C and a transition joint 232222C. The transition joint 232222C is detachably mounted on the extension main body 232221C and coaxially aligned with it. The cleaning head 22C is detachably installed on the transition joint 232222C.

As shown in FIG. 17, the electric cleaner 20C further comprises a sealing assembly 28C to prevent high-temperature steam ejected from nozzle 2132C from flowing back into the cleaner's interior, thereby avoiding adverse effects on other structural components. In this third preferred embodiment of the present invention, the sealing assembly 28C comprises a first sealing ring 281C and a second sealing ring 282C. The first sealing ring 281C is positioned between adapter 232222C and the extension body 23222C of passive rotary body 2322C, sealing the gap between them to prevent steam from entering gear housing 2323C. The second sealing ring 282C is installed in the gap between adapter 232222C and nozzle 2132C, similarly preventing steam from entering the gear housing 2323C. In other words, the combined action of the first and second sealing rings 281C and 282C effectively prevents steam ejected from nozzle 2132C from entering the gear housing 2323C.

The electric cleaner 20C also comprises a heat dissipation member 29C, which is arranged on the outer side of the rotating motor 231 to dissipate the heat of the rotating motor 231.

In other embodiments of the present invention, the device for generating high-temperature steam may also be built into the electric cleaner. In other embodiments, the electric cleaner may further include a drying system to dry items after cleaning, the present invention is not limited to these aspects.

In detail, the preferred embodiments of this invention demonstrate that electric cleaners can not only clean surfaces using high-temperature steam combined with an electrically driven cleaning head, but also employ other fluids like liquid water through similar mechanisms. In detail, alternative implementations reveal that the steam delivery system can alternatively serve as a fluid conduit, directing water or other fluids to the cleaning head area for thorough surface treatment. The present invention is not limited to these specific applications in this regard.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention comprises all modifications encompassed within the spirit and scope of the following claims.

What is claimed is:

1. An electric cleaner, comprising: a steam delivery system; a cleaning head; and a drive assembly, wherein said steam delivery system directs high-temperature steam to said cleaning head, so as to form a high-temperature steam environment, wherein said drive assembly electrically drives said cleaning head to move within said high-temperature steam environment;

wherein said drive assembly comprises a rotating motor and an eccentric transmission assembly, wherein said rotating motor is powered by electrical energy to generate rotational force around a first axis, wherein said eccentric transmission assembly is driven by the rotational force from said rotating motor, thereby rotating said cleaning head around a second axis, wherein the first axis and the second axis maintain a predetermined distance while remaining parallel to each other;

wherein said eccentric transmission assembly comprises a torque-enhancing assembly and a passive rotary body, wherein said torque-enhancing assembly is driven by said rotating motor to rotate around the first axis, wherein said passive rotary body engages with said torque-enhancing assembly and rotates around the second axis under the drive of said torque-enhancing assembly, thereby driving said cleaning head to rotate around the second axis;

wherein said torque-enhancing assembly comprises a first sun gear, a first planetary gear set, an internal gear ring, a first turntable, a second sun gear, a second planetary gear set, and a second turntable, wherein said rotating motor comprises a motor body and a motor output shaft extending from said motor body, wherein said motor output shaft defines the first axis, wherein said motor output shaft is driven to rotate around the first axis, wherein said first sun gear is fixedly connected to said motor output shaft, rotating with said motor output shaft to drive said first planetary gear set to rotate around said first sun gear, wherein said internal ring gear engages with said first planetary gear set to guide the rotation of said first planetary gear set, wherein movement of said first planetary gear set drives said first turntable to rotate around said first shaft, wherein rotation of said first turntable synchronously drives said second sun gear to rotate, and further drives said second planetary gear set to rotate around said second sun gear, wherein said internal ring gear engages with said second planetary gear set to limit the rotation of said second planetary gear set, wherein movement of said second planetary gear set drives said second turntable to rotate around said first shaft, wherein said second turntable engages with a passive rotary body, so as to drive said passive rotary body to rotate around the second axis and further drive said cleaning head to rotate around the second axis.

2. The electric cleaner, as recited in claim 1, wherein said steam delivery system guides the high-temperature steam to a central axial position of said cleaning head.

3. The electric cleaner, as recited in claim 2, wherein said steam delivery system comprises a connector, a conduit and a steam injection assembly, wherein the high-temperature steam is introduced from said connector, enters said conduit and is ejected through said steam injection assembly.

4. The electric cleaner, as recited in claim 3, wherein an extension direction of said steam injection assembly is perpendicular to the rotation direction of said cleaning head, so as to ensure that the steam injection direction intersects with the rotation direction of said cleaning head.

5. The electric cleaner, as recited in claim 4, wherein said steam injection assembly comprises an adapter and a nozzle, wherein said adapter is connected between said nozzle and said conduit, and wherein said nozzle is made of metal.

6. The electric cleaner, as recited in claim 5, wherein said cleaning head comprises a brush body and a fixation body, wherein said brush body is fixedly connected to said fixation body, wherein said fixation body has a through hole for said steam injection assembly to pass through.

7. The electric cleaner, as recited in claim 6, wherein said through hole is arranged at an axial position of said fixation body, wherein said fixation body further has a steam guide channel communicating with said through hole.

8. The electric cleaner, as recited in claim 7, wherein said passive rotary body comprises an eccentric gear and an extension body, wherein said extension body extends from said eccentric gear, wherein said passive rotary body further has a rotor channel for passing through said steam delivery system.

9. The electric cleaner, as recited in claim 8, further comprising a shell, wherein said shell comprises a steam passage section and a handle section, wherein said steam passage section is spaced apart from said handle section, wherein said steam passage section defines a steam delivery system channel through which said steam delivery system passes.

10. The electric cleaner, as recited in claim 9, wherein said steam delivery system further comprises an insulating material, wherein said insulating material is arranged to outer periphery of said conduit and is fixed in said steam delivery system channel.

11. The electric cleaner, as recited in claim 10, wherein said eccentric transmission assembly further comprises a gear housing for accommodating and fixing said torque-enhancing assembly and said passive rotary body.

12. The electric cleaner, as recited in claim 3, wherein said connector has a detachable connection structure, so as to be detachably connected to a steam generator.

13. The electric cleaner, as recited in claim 12, wherein said detachable connection structure is selected from threads, grooves, bumps and key card slots.

14. The electric cleaner, as recited in claim 1, further comprising a control system and a power supply unit, wherein said power supply unit powers both said control system and said rotating motor, wherein said control system comprises a current detection module and a control module, wherein said current detection module monitors current flowing through said rotating motor, wherein when detected current exceeds a predetermined threshold, said control module activates to stop the operation of said rotating motor.

* * * * *